US011805181B2

(12) United States Patent
Srivastava et al.

(10) Patent No.: US 11,805,181 B2
(45) Date of Patent: Oct. 31, 2023

(54) MIGRATION OF SOFTWARE EXTENSIONS

(71) Applicant: SAP SE, Walldorf (DE)

(72) Inventors: Garima Srivastava, Bangalore (IN);
Yeshwant More, Bangalore (IN);
Jenifer Sam, Bangalore (IN)

(73) Assignee: SAP SE, Walldorf (DE)

( * ) Notice: Subject to any disclaimer, the term of this patent is extended or adjusted under 35 U.S.C. 154(b) by 134 days.

(21) Appl. No.: 17/500,397

(22) Filed: Oct. 13, 2021

(65) Prior Publication Data

US 2023/0116489 A1    Apr. 13, 2023

(51) Int. Cl.
| | | |
|---|---|---|
| G06F 9/44 | (2018.01) |
| H04L 67/00 | (2022.01) |
| G06F 16/21 | (2019.01) |
| G06F 16/25 | (2019.01) |
| G06F 8/76 | (2018.01) |

(52) U.S. Cl.
CPC .............. H04L 67/34 (2013.01); G06F 8/76 (2013.01); G06F 16/213 (2019.01); G06F 16/214 (2019.01); G06F 16/258 (2019.01)

(58) Field of Classification Search
CPC ........... H04L 67/34; G06F 8/76; G06F 16/214
See application file for complete search history.

(56) References Cited

U.S. PATENT DOCUMENTS

| | | |
|---|---|---|
| 7,406,695 B2 | 7/2008 | Dattke et al. |
| 7,860,890 B2 | 12/2010 | Riemann et al. |
| 8,863,005 B2 | 10/2014 | Lehr et al. |
| 8,904,343 B2 | 12/2014 | Balko et al. |
| 9,021,392 B2 | 4/2015 | Baeuerle et al. |
| 9,069,607 B1* | 6/2015 | Gopalakrishna Alevoor ............. G06F 9/45558 |
| 9,542,178 B2 | 1/2017 | Witteborg et al. |

(Continued)

OTHER PUBLICATIONS

Arai, "Adding Custom database Field to standard Fiori apps in S/4HANA with Custom Fields and Logic," available from https://blogs.sap.com/2020/02/06/adding-the-field-already-in-the-table-to-standard-fiori-apps-with-custom-field-and-logic/, pp. 1-21 (Feb. 2020).

(Continued)

*Primary Examiner* — Hang Pan
(74) *Attorney, Agent, or Firm* — Klarquist Sparkman, LLP

(57) ABSTRACT

Extensions to a source software application are migrated to a target. Template records are constructed containing corresponding sets of attributes for source and target applications. Analysis of a source extension yields source extension attributes. A matching template record is used to map the source extension attributes to corresponding target extension attributes. A proposal for a migrated target extension is formulated, simulated in a sandbox, and committed to the target application. Client interaction supports selection or approval of application versions, proposals, or simulation output. Template records, constructed without knowledge of specific extensions implemented on a particular application instance, are provided to the source application environment, enabling remaining migration operations to be performed locally in source and target environments, maintaining data privacy. Examples are provided for a front-end software application in a database environment. Methods and apparatus are disclosed, with variations, extensions, and applicability to diverse software applications.

20 Claims, 11 Drawing Sheets

(56) References Cited

U.S. PATENT DOCUMENTS

| | | | |
|---|---|---|---|
| 9,678,740 | B2 | 6/2017 | Heine et al. |
| 9,760,364 | B2 | 9/2017 | Wieczorek et al. |
| 10,037,431 | B2 | 7/2018 | Allgaier |
| 10,114,843 | B2 | 10/2018 | Fischer et al. |
| 10,353,564 | B2 | 7/2019 | Voutta et al. |
| 10,417,248 | B2 | 9/2019 | Demant et al. |
| 10,474,648 | B2 | 11/2019 | Schreter et al. |
| 10,552,023 | B2 | 2/2020 | Rath |
| 10,558,473 | B2 | 2/2020 | Klemenz |
| 10,614,062 | B2 | 4/2020 | Srivastava et al. |
| 10,650,015 | B2 | 5/2020 | Subramanian et al. |
| 10,824,648 | B2 | 11/2020 | Srivastava |
| 10,824,968 | B2 | 11/2020 | Williger et al. |
| 10,983,782 | B1 | 4/2021 | Mitra et al. |
| 11,042,517 | B2 | 6/2021 | Stegmann |
| 2012/0072903 | A1* | 3/2012 | Joukov ............... G06F 8/63 717/175 |
| 2015/0317167 | A1* | 11/2015 | Zhou ............... G06F 9/445 717/166 |
| 2020/0012970 | A1 | 1/2020 | Srivastava et al. |

OTHER PUBLICATIONS

Arai, "Adding Field in standard Fiori apps of S/4HANA with Custom Fields and Logic," available from https://blogs.sap.com/2020/02/01/adding-field-in-standard-fiori-apps-of-s-4hana-with-custom-fields-and-logic/, pp. 1-66 (Feb. 2020).

SAP, "About SAP Commerce—Extension Concept," (excerpt), pp. 1-69, downloaded from https://help.sap.com/viewer/b490bb4e85bc42a7aa09d513d0bcb18e/2105/en-US/71f40f847d034d289c365149848d4fde.html on Sep. 26, 2021.

SAP, "SAP Fiori Apps for SAP NetWeaver—Extensibility Information," (excerpt), pp. 1-11, downloaded from https://help.sap.com/viewer/b4367b1cec3243c4989f0ff3d727c4ab/7.5.8/en-US/3ccb50e724b045508fea8b2cf1774b2b.html on Sep. 26, 2021.

SAP, "2312869—Frequently Asked Questions on Migration and its Processes," pp. 1-6, downloaded from https://userapps.support.sap.com/sap/support/knowledge/en/2312869 on Sep. 26, 2021.

SAP, "1842942—How to add an extension field in the data migration template," pp. 1-2, downloaded from https://userapps.support.sap.com/sap/support/knowledge/en/1842942 on Sep. 26, 2021.

Thinakaran, "Customer Master creation and extension in S/4 using Migration cockpit (LTMC)," available from https://blogs.sap.com/2020/08/13/customer-master-creation-and-extension-in-s-4-using-migration-cockpit/, pp. 1-15 (Aug. 2020).

* cited by examiner

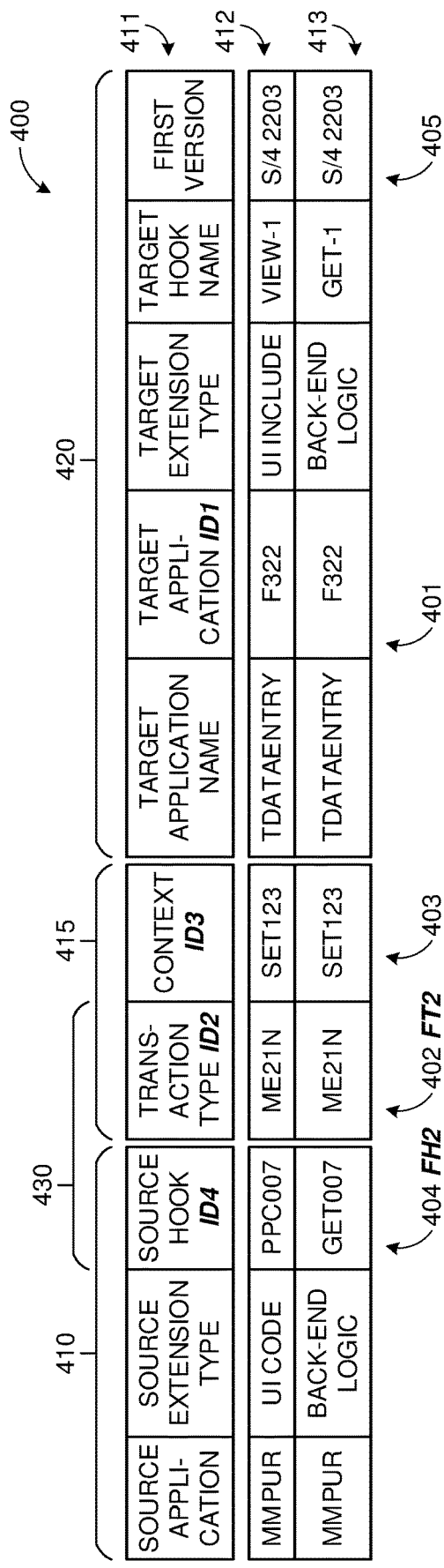
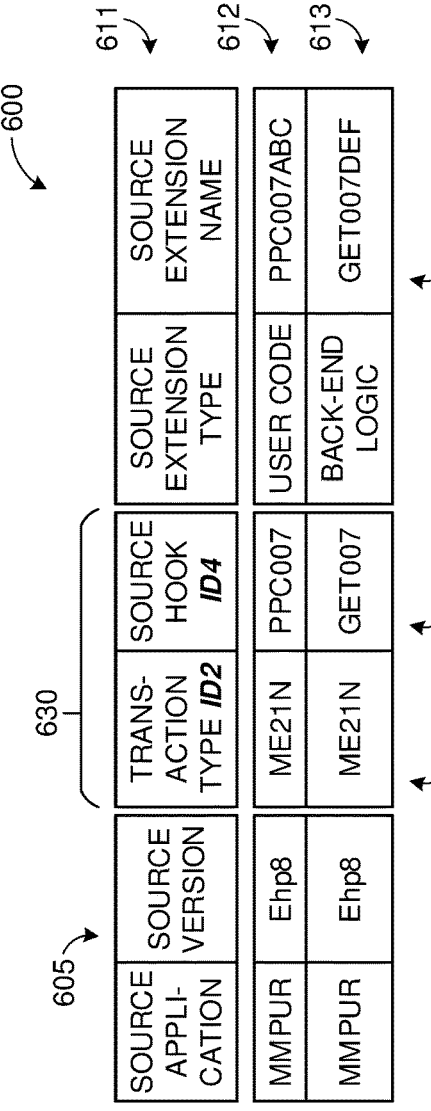
FIG. 4
FIG. 6

500

510 ANALYZE SOURCE FRONT-END APPLICATION *A1* TO GENERATE ONE OR MORE SOURCE RECORDS *{R1}* HAVING FIELDS *FE1*, *FH1*, *FT1* REPRESENTING SOURCE EXTENSION *E1* IMPLEMENTED IN *A1*, CORRESPONDING HOOK *H1* OF *A1*, AND CORRESPONDING TRANSACTION TYPE *T1*

520 COMPARE *{R1}* WITH TARGET RECORDS *{R2}* TO FIND MATCHES *{M12}* BETWEEN *FH1*, *FT1* OF *R1* AND *FH2*, *FT2* OF *R2*, WHEREIN TARGET RECORDS *{R2}* HAVE FIELDS *FH2*, *FT2*, *FA2* REPRESENTING TARGET HOOK *H2*, TRANSACTION TYPE *T2*, AND TARGET APPLICATION *A2*

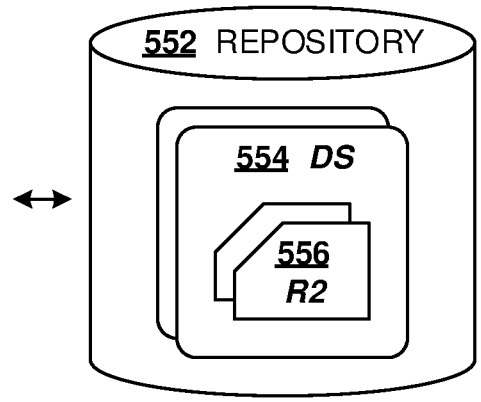

552 REPOSITORY
554 DS
556 R2

530 FOR MATCH *M12*, FORMULATE MIGRATION PROPOSAL *X12* OF EXTENSION *E1*, USING TARGET APPLICATION *A2* AND TARGET HOOK *H2*

*FIG. 5*

MIGRATION OF SOFTWARE EXTENSIONS

BACKGROUND

Extensions are commonly used to extend the functionality of a base software application to fulfill installation-specific needs. Software applications are often migrated from a legacy platform to a new platform. The author or manufacturer of the base software application can provide a new version of the base software application for the new platform. However, to replicate the full functionality on the new platform, migration of the extension is also desirable. Presently available approaches are laborious, often requiring considerable effort to analyze and replicate each extension's custom functionality. Accordingly, there remains a need for improved technologies for efficient migration of extensions.

SUMMARY

In brief, the disclosed technologies are directed to various innovative technologies for migrating extensions of a base source application to a target application. In examples, an extension migration template record can provide a mapping from a set of source attributes to corresponding target attributes, and can be created from existing libraries or registries in source and target environments. One or more records can be aggregated in an extension migration template data structure. Subsequently, a specific deployed source application can be analyzed to obtain respective source extension records for each extension implemented in the source application. Each source extension record can be matched against the extension migration template data structure to obtain a matching template record, which can be used to map attributes from the source extension record to corresponding target attributes, based on which a proposal for a target extension can be formulated. The target extension proposal can be simulated, in the target environment or in a sandbox facsimile, drawing upon definitions (identifiers, static data, or other attributes) already present as configuration data in the source environment. Upon successful simulation, the changes implementing the target extension can be replicated or committed in the target environment.

In certain examples, the disclosed technologies can be implemented as a computer-implemented method for building or maintaining an extension migration template data structure. A respective first identifier is retrieved from one or more libraries for each application of a first group of one or more applications. A respective second identifier is retrieved for each transaction type of a second group of one or more transaction types. A respective third identifier is retrieved for each context of a third group of one or more application contexts. A respective fourth identifier is retrieved from one or more registries for each hook of a fourth group of one or more hooks. For each of one or more tuples, a record is stored in the extension migration template data structure. Each tuple includes a corresponding application of the first group, a corresponding transaction type of the second group, a corresponding context of the third group, and a corresponding hook of the fourth group. The record includes the respective first identifier of the corresponding application, the respective second identifier of the corresponding transaction type, the respective third identifier of the corresponding context, and the respective fourth identifier of the corresponding hook. The corresponding application and the corresponding hook are each operable with the corresponding context, and the corresponding application performs the corresponding type of transaction.

In some examples, for at least one of the tuples, the corresponding application can be a front-end application and the corresponding hook can link to a back-end extension. In other examples, for at least one of the tuples, the corresponding application can be a front-end application and the corresponding hook can link to a front-end extension. The storing the record can include replacing an earlier record in the extension migration template data structure. The one or more applications of the first group can be user interface applications of a database environment.

In further examples, a source software application having a source extension can be analyzed in a migration process, to obtain a source record. A matching record can be retrieved from the extension migration template data structure. The source record can include the second and fourth identifiers of the matching record. A migration proposal for the source extension can be formulated, based on the corresponding application of the matching record. The migration proposal can be implemented by retrieving fields of the source extension from a configuration database of the source software application. The retrieved fields can be bound to the corresponding application of the matching record.

In additional examples, for a given application of the first group, the respective first identifier can be a given first identifier; for a given transaction type of the second group, the respective second identifier can be a given second identifier; for a given application context of the third group, the respective third identifier can be a given third identifier; and, for a given hook of the fourth group, the respective fourth identifier can be a given fourth identifier. The one or more libraries can store a first mapping between the given first identifier and the given second identifier. The one or more registries can store a second mapping between the given third identifier and the given fourth identifier. The respective second identifier of the given transaction type can be retrieved using the given first identifier as a key to obtain the given second identifier from the first mapping. The respective fourth identifier of the given hook can be retrieved using the given third identifier as a key to obtain the given fourth identifier from the second mapping.

In certain examples, the disclosed technologies can be implemented as computer-readable media storing first instructions, second instructions, and third instructions executable on hardware processors. Execution of the first instructions analyzes a source front-end application and generates one or more source records. Each source record includes a first field representing a source extension implemented in the source front-end application, a second field representing a source hook through which the source extension is implemented, and a third field representing a corresponding source transaction type. Execution of the second instructions compares the one or more source records with target records to determine one or more matches. Each target record includes a fourth field representing a target hook available in a target application, a fifth field representing a target transaction type, and a sixth field representing the target application. Each match indicates a given source record and a given target record for which the second and fourth fields are matched and the third and fifth fields are matched. Execution of the third instructions formulates, for at least a given match, a proposed migration of the source extension represented by the first field, using the target application represented by the sixth field and the target hook represented by the fourth field.

In some examples, the first instructions can be resident in a customer environment and the analyzing can include retrieving private data within the customer environment.

The first instructions can be executed in response to a request from a client to migrate the source front-end application to a target environment incorporating the target application. Execution of the third instructions can cause the proposed migration to be presented at the client for approval. Execution of the first instructions can also determine a version of the source front-end application. Execution of the second instructions can also select the target application from a plurality of applications, based at least partly on the version. Execution of the second instructions can cause a service request to be transmitted to a management host of the target application, in a case where no match is found for a given record of the one or more source records. The source front-end application and the target application can implement at least portions of a graphical user interface in a database environment.

In certain examples, the disclosed technologies can be implemented as a system having a database environment, a source application environment, and a target application environment. The system also includes one or more hardware processors, with memory coupled thereto, together with computer-readable media instructions which, when executed by the hardware processor(s), cause the following operations to be performed. Extension fields of a source extension are retrieved from a configuration database in the source application environment. At the target application environment, the extension fields are bound to a target extension of a target application. The target application is executed, with the target extension and the bound extension fields, to produce an output representative of the source extension migrated to the target application environment.

In some examples, the retrieving, binding, and executing operations can implement a proposal for migration of the source extension to the target application, and the system can be configured to perform the retrieving, binding, and executing operations responsive to user approval of the proposal. The operations can also include committing the bound extension fields to the target extension of the target application.

In other examples, the retrieving, binding, and executing operations can implement a proposal for migration of the source extension to the target application, and execution of the instructions can also cause following operations to be performed. A first record can be obtained comprising one or more attributes of the source extension. A match can be determined between the first record and a second record, the source record including one or more attributes of the target extension. Fields of the first record and the second record can be combined to obtain the proposal for migration of the source extension.

In additional examples, the source extension can be a front-end source extension and the operations can include binding back-end logic of a back-end source extension to the target extension of the target application. The source application environment and the target application environment can provide respective user interfaces to the database environment.

The foregoing and other objects, features, and advantages of the invention will become more apparent from the following detailed description, which proceeds with reference to the accompanying figures.

BRIEF DESCRIPTION OF THE DRAWINGS

FIG. 4 is a diagram depicting example extension migration template records according to the disclosed technologies.

FIG. 5 is a flowchart of an example method for formulating an extension migration proposal according to the disclosed technologies.

FIG. 6 is a diagram depicting example records of an analyzer output according to the disclosed technologies.

DETAILED DESCRIPTION

Introduction

Figure 1:
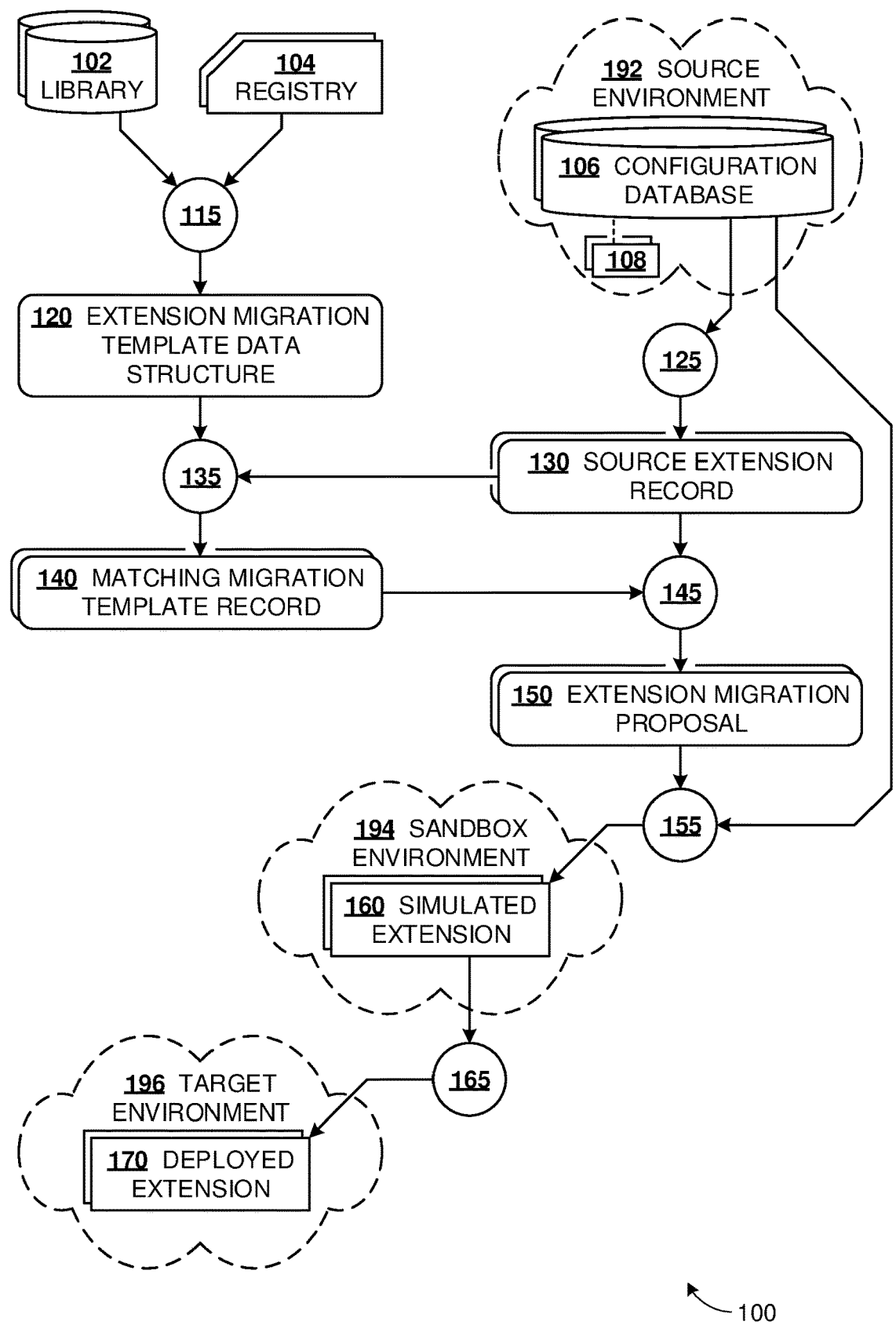
FIG. 1 is an example data flow diagram for extension migration according to the disclosed technologies.

It is commonplace to enhance a base software application with extensions. Extensions can be installed for diverse reasons. In a front-end interface to a database environment, an exemplary extension can provide additional display fields or additional input controls on an existing display page. Such extensions can variously be linked to other front-end logic (e.g. other display pages) or back-end logic (e.g. to read or write data in an underlying database). Extensions can similarly enhance user functionality of other software applications, not limited to front-end applications or database environments. In other use cases, extensions can provide enhancements which may not be visible to an end user, such as improving security by implementing an audit trail, or incorporating remote management access.

It is also commonplace for software applications to migrate, due to evolving technology or a change in platform, such as from a legacy user interface to a modern user experience paradigm, or from data center to cloud. While an author of a software application can be expected to support migration of a base software application, an effective path for migration of extensions has hitherto been lacking. Conventionally, a developer of the original (source) extension can be called upon to re-engineer the original extension for the target application. Such a process can be considerably laborious, requiring significant debugging effort, and having a steep learning curve for the workings of the target environment, in order to identify appropriate target-side features to be used.

Data privacy raises additional concerns. The source software application can access private data of an end user, and the program code of the extension can also be regarded as confidential. Thus, migrating the extension without exposing private data or code to an outside party can be a challenge.

The disclosed technologies address these problems and enable extensions to be migrated in a straightforward and largely automated manner, without requiring deep engineering effort, and without compromising data privacy. In many scenarios, only minimal user input is required, e.g. to select which application, extensions, or versions thereof are to be migrated, to select or approve a migration proposal, or to approve the migrated extension based on simulation results.

Examples of the disclosed technologies make use of the fact that information defining a source software extension and information defining facilities of the target application are already available in source and target environments respectively. Additionally, there is often commonality of certain attributes between source and target environments.

Common attributes can be used to map source extension attributes to corresponding target-side attributes. In some examples, an extension migration template record can provide such a mapping, and can be created from existing libraries or registries in source and target environments, without knowledge of any specific extension installed in a customer environment. An extension migration template data structure can group multiple such records.

Subsequently, a specific deployed source application can be analyzed to obtain respective source extension records for each extension implemented in the source application. Extensions can occur in groups. For example, an enhancement of a graphical user interface (GUI) page can include display of a dynamic output field, back-end logic to obtain the displayed value, an input control, front-end logic to implement the control, and display of a static informational field. Thus, analysis of the source application can result in a group of source extension records, one record for each extension. Each source extension record can be matched against the extension migration template data structure to obtain a matching template record, which can be used to map attributes from the source extension record to corresponding target attributes, based on which a proposal for a target extension can be formulated. Source application analysis and proposal formulation can be performed entirely within a customer environment, using tools and migration templates provided by an author of the base software application. Thus, data privacy can be maintained. In some examples, the disclosed technologies, including tools and migration templates, can be provided as a Software-as-a-Service (SaaS) product.

The target extension proposal can be simulated, in the target environment or in a sandbox facsimile, drawing upon definitions (identifiers, static data, or other attributes) already present in the source environment, e.g. in one or more configuration databases. Upon successful simulation, the changes implementing the target extension can be replicated or committed in the target environment.

Examples are described herein for a front-end application in a database environment. However, the disclosed technologies are not so limited. Particularly, the disclosed technologies can be applied across a range software segments including, without limitation, infrastructure software (e.g. cloud infrastructure, virtual computing, networking, web, or operating systems software), productivity software (e.g. general purpose office software, collaboration tools), development software (e.g. interactive development environments, compilers, debuggers, version control software), or enterprise software (e.g. enterprise resource planning, business intelligence, project management software).

These and other features of the disclosed technologies are brought out through examples described below.

Terminology

An "application" or "software application" is a computer-executable program performing functions for one or more clients, and can be distinct from an operating system, a software library, a test suite, or a development environment. Additionally, some applications can operate without clients, e.g. launched by a supervisor or another application, performing tasks autonomously or in an event-driven mode. An application can include both executable instructions (dubbed "code" or "program code") and non-executable data (dubbed "application data" or "program data"). Many modern applications can support multiple clients concurrently, and each client can be isolated from other clients, so that each client perceives having its own copy of the application. These actual or perceived copies of the application are dubbed "application instances." The term application instance extends to an application having a single instance. Some applications can be organized in "front-end" portions which are client-facing, or with which a client can directly interact, and "back-end" portions, which are not client-facing. Front-end and back-end portions of an application can be joined by middleware portions of the application. A software application as provided by the author of the software application is dubbed a "base software application." The author can be an individual or an organization. Some applications described herein can include one or more "extensions," which are software modules not part of the base software application. Extensions to a front-end or performing front-end functions are dubbed "front-end extensions" and extensions to a back-end or performing back-end functions are dubbed "back-end extensions."

An "application context" (or simply "context") is a collection of tables or other data structures supporting a given software application. As an illustration, a database environment can support three applications (A, B, C) and ten tables (1-10). If the applications respectively require tables 1-5, 4-8, and even-numbered tables, then the context of application A can be the set of tables 1-5. Similarly, the context of application B can be the set of tables 4-8 (so that tables 4-5 are part of both contexts), and the context of application C can be the set of tables (2, 4, 6, 8, 10). Each application context can have a respective identifier, such as "Context-A," "Context-B," and "Context-C."

An "attribute" is a data value that characterizes a software entity. Non-limiting examples of such software entities include a base software application, an extension, an underlying database, or a computing environment. Attributes can include data or metadata. Non-limiting examples of attributes include identifiers (e.g. of hooks, applications, versions, extensions, contexts, transaction types, GUI components; records, columns, or metadata of an underlying database; links to front-end, back-end, or other support program logic), static GUI components, or links to other data objects.

A "back-end" (or "engine") is a module or other portion of a software application which provides application logic used by other portions of the software application. Back-ends can perform the work of an application. Non-limiting functions of back-ends can include retrieving data from an underlying database, updating data in the underlying database, performing queries or analysis on the database, performing other data operations, or maintaining application state. In varying examples of the disclosed technologies, a back-end can be an integral part of a base software application (dubbed an "integral back-end"), can be an extension to the integral back-end, or can be an extension of the base software application independent of any integral back-end.

A "front-end" is a module or other portion of a software, which is client-facing. A front-end can provide one or more interfaces to the software application, each of which can be a graphical, other visual, or other sensory interface; an application programming interfaces ("API"); or a message-passing or other communication interface. A front-end interface can provide input and output functions for the software application, or can be input-only or output-only. Non-limiting examples of front-ends can provide remote terminal or command-line access, a webpage or browser interface, screenshare, source code debugging, an interactive database session, a mobile app, or other interfaces. In varying examples of the disclosed technologies, a front-end can be an integral part of a base software application (dubbed an "integral front-end"), can be an extension to the integral front-end, or can be an extension of the base software application independent of any integral front-end.

The term "bind" refers to a procedure linking two software entities. In some examples, a data object such as a field or a data value can be bound to a software program such as an extension or other software module, however this is not a requirement. In other examples, two data objects can be bound, e.g. in a tuple, or two software programs can be bound, e.g. base software application and an extension.

A "client" is a hardware or software computing entity that uses a resource provided by another hardware or software computing entity dubbed a "server." Some clients can operate interactively with a user, providing prompts, information, or output to the user, or receiving input from the user; however, this is not a requirement. Other clients can operate in an unattended or head-less mode. The unqualified term "data" refers to any digital representation of information.

"Private" data, including executable code, refers to data (or code) which is managed or owned by a customer of a software application, and not shared with the author of the software application. Examples of the disclosed technology can be provided by the author of the software application, to beneficially support migration of such private data (code) and associated functionality without exposing such private data (code).

A "data structure" is an organized collection of at least two fields or records (which in turn comprise fields). Each field of a data structure can have a respective value or can be undefined. Non-limiting examples of data structures include arrays, linked lists, parameter lists, records, tables (which can be tables of a relational database), tuples, or an entire database.

A "database" is an organized collection of data maintained on computer-readable media and accessible by execution of instructions at one or more processors. Databases can be relational, in-memory or on disk, hierarchical or non-hierarchical, or any other type of database. Some databases of interest in this disclosure are organized as "tables," each table having multiple records and each record being a collection of fields having respective values. The fields of two records can be the same, while the corresponding values can be the same or can vary between records. In some examples, records can be organized as rows of a table, with like fields of the records forming a corresponding column of the data table. In varying examples, the specific organization of the table can differ, e.g. rows and columns of a two-dimensional table can be transposed, or the table can be organized as an array having three or more dimensions ("multi-dimensional"). Regardless of the physical or logical organization of the records or table, a "row" denotes one record, and a "column" denotes a collection of like fields (which can have varied values) over a collection of one or more records.

A "computing environment" (or simply "environment") refers to a combination of hardware (e.g. processors, memory, storage, network interface) and software (e.g. operating system, utilities) on which a given software application can be run. Some environments of interest herein include a database environment, an application environment, a customer environment, a test environment (e.g. a sandbox), or a production environment.

A "configuration database" is a database of attributes of a software application or extension. Configuration data of an extension can include custom attributes that are specific to that extension and can be private, and can also include generic attributes such as hook, context, transaction type, or applicable base software version(s). The custom attributes can provide the detailed definition of the source extension which can be used to replicate a corresponding target extension. The disclosed technologies can retrieve the generic attributes to obtain source extension records and can retrieve the custom attributes for simulation of the target extension. Configuration databases can be organized in diverse ways. In some examples, a first table can store high level data of various enhancements implemented in a computing environment at a project level. A second table can store, for each enhancement, generic attributes of the various extensions constituting the enhancement, and a third table can store, for each enhancement, custom attributes of these extensions.

An "extension" is a software function or module which can be coupled to a base software application to supplement the functionality of the base software application. In some examples, an extension can enhance front-end or back-end functionality of the software application. An extension can read, write, or modify fields dubbed "extension fields," which can be fields of an underlying database. Examples of the disclosed technologies can "analyze" an extension to determine, e.g., its extension fields, the extension hooks through which it is coupled to the base software application, or other properties of the extension. Examples of the disclosed technologies can "simulate" an extension according to a proposal, to demonstrate exemplary behavior of the proposed extension, e.g. by executing the proposed extension in a sandbox. Examples of the disclosed technologies can "generate" the proposed extension or the simulated extension, e.g. by committing the proposed or simulated extension in a target application environment so that the generated extension is coupled to the target application through a hook of the target application. An extension can have a variety of attributes, including generic attributes, which are part of or associated with the base source software application and generally not private, and custom attributes, which are specific to the implemented extension and can be private. To illustrate, an extension hook can be a generic attribute, while program code or data of a specific extension linked to this hook can be a custom attribute. Non-limiting examples of generic extension attributes include identifiers of (a) the base software application to which it is coupled, (b) the hook through which it is coupled to the base software application, (c) version(s) of the base software application with which it is compatible, (d) supported transaction type(s). An example of a custom attribute can be (e) dependencies of the extension, i.e. software modules or data objects required for proper functioning.

The term "extension migration template" ("EMT") refers to a data object providing mapping from source extension attributes to corresponding attributes of a target application. The source extension attributes can be generic attributes. An extension migration template can be instantiated as a record ("EMT record"), providing one mapping for one source extension, or as a data structure ("EMT data structure") aggregating one or more such records. A single source extension can have multiple EMT records, e.g. for respective versions of the target application.

A "hook" (or "extension hook") refers to a facility within a base software application to link to or execute extensions to the base software application. As an illustration, a hook can be a software function that searches for or identifies an extension having a predetermined name, address, or entry point. The extension can be directly executed from the hook, or can be registered within the software application environment for subsequent invocation.

A "field" is a member of a data structure (e.g. a database, a table, a record, a query data structure, or a parameter list) having a particular role. A field can have a value, or can be undefined.

An "identifier" is a value that uniquely identifies a software entity in the context of a given field. To illustrate, in the context of an "application-id" field, the value 3 can identify an application named "application-3." The same value can identify different entities in the context of different fields. To illustrate, in the context of a "hook-id" field, the same value 3 can identify an extension hook named "hook-3."

A "library" contains metadata of a collection of software programs available in a computing environment. Non-limiting examples of library metadata can include identifiers for a program (e.g. a software application), its associated context, or its transaction type. While some disclosed examples have a 1:1:1 correspondence between software application, context, and transaction type, this is not a requirement. In other examples, an application can support multiple transaction types, with respective contexts for each supported transaction type. In further examples, a single context can be shared among multiple applications or multiple transaction types. Similarly, a given transaction type can sometimes be performed by multiple applications. In varying examples, the library metadata can have application identifier, context identifier, transaction type identifier, or another field as one or more keys. Some libraries can include the collection of software programs, or links to the programs, but this is not a requirement. In varying examples, library metadata can be organized as a table, a list of tuples, or as another data structure.

As adjectives, "matched" or "matching" refer to two data objects (or other software entities) which satisfy a predetermined mutual constraint. As an illustration, two atomic data objects can be matched if they are equal. As another illustration, two data records can be matched if a predetermined set of their fields are equal or have a same property. As a further illustration, two software entities (data or functions, in any combination) can be matched if one of the entities specifies a condition and the other entity satisfies the condition. That is, the predetermined mutual constraint can be specified by one of the matching entities. As a noun, a "match" is an attribute which can refer to either or both of the matching entities. Thus, entities A and B can be a match, or entity A can be a match to entity B. As a verb, "match" refers to a process for finding a matching entity B for a given entity A.

"Migration" refers to moving or replicating functionality from one computing environment (dubbed a "source environment") to another environment ("target environment"). In some examples of interest herein, functionality of an extension ("source extension") of a software application ("source application") in the source environment can be migrated to an extension ("target extension") of a corresponding application ("target application") in the target environment. In some examples, the source application or environment can have "legacy" status, indicating that the source application or environment is scheduled to be taken out of service or to become unsupported, e.g. in favor of the target application or environment. Through analysis of the source extension and knowledge of the target environment, examples of the disclosed technologies can develop a specification ("proposal") of a target extension that will replicate the source extension functionality in the target environment, prior to implementing such a target extension. The proposed target extension can be "simulated" by implementing in a sandbox environment, simulation being performed without making any changes in the target environment. Subsequently, the target extension can be "generated" by committing the proposed or simulated target extension in the target environment, e.g. making changes to program or data structures in the target environment so that the target extension is available for use from the target application.

A "record" is a collection of multiple data fields having respective values, and is used in different contexts. In the context of a database, a record can be a row of a database table, with the fields of the record containing respective values for the columns of the database table. In the context of other data structures, a record can be one unit among multiple units of a data structure, the units (records) sharing a common specification for their fields, but having possibly different values for one or more of the fields.

A "registry" is a data structure in a computing environment storing associations among identifiers and attributes of software entities (programs or data objects) within the computing environment. To illustrate, some registries disclosed herein store associations between hooks and application contexts.

A "store" or "repository" is an organization of data objects in a data storage apparatus.

A "request" is a message to which a substantive response ("response") is expected, that is, a response beyond an acknowledgment; or a message for which a recipient of the message is expected to take a specified action. In contrast, a "notification" or a "report" need not receive a substantive response, nor result in any specific action. A "service request" is a request on a managed computing environment requiring attention of an administrator or a development team. A service request can be transmitted to a computer (dubbed "management host") at which the administrator or development team can receive or handle the service request, e.g. by making suitable program or data updates to the managed computing environment.

A "role" is an attribute of a participant in an interaction. A role can indicate one or more behaviors or functions which the participant is capable of. In described examples, software applications or software components of the disclosed technologies can interact with one or more non-software entities such as an organization or a person. Non-limiting examples of roles for non-software entities include a software author, a partner of the software author, a customer of the software author or partner, a user, and an agent. Software entities such as applications, data structures, or fields can also take on roles. In varying examples, roles can be fixed, can vary over time, or can vary between types of interaction.

A "sandbox" is a computing environment used for test, in which operations do not modify production programs or production data. In some examples, a candidate extension can be tested with a target application in a sandbox to verify functionality, prior to committing the extension in a production environment of the target application.

"Software" refers to computer-executable programs or instructions and associated data structures. Software can be in active or quiescent states. In an active state, software can be loaded into memory, or can be undergoing execution by one or more processors. In a quiescent state, software can be stored on computer-readable media, awaiting transmission or execution. Software can be organized as one or more "modules." A module can contain one or more executable functions and associated data directed to a common task or group of related tasks. One or more such executable functions and associated data are sometimes referred to as "logic". Software can be offered as a service, which can be implemented by one or more modules.

As applied to data objects, the term "store" refers to writing a value of the data object to a location on a storage medium, and the term "retrieve" refers to reading a value of the data object from a location on a storage medium. Non-limiting examples of storage media can include a hard disk or semiconductor memory.

A "transaction" is a task performed by a software application in response to a request from a client of the software application. In some examples, the transaction can be a "database transaction," e.g. a query or an update performed on an underlying database, but this is not a requirement, and the disclosed technologies can also be applied to other application environments and other classes of transactions. A "transaction type" identifier can distinguish tasks performed in a database environment or other environment. To illustrate, queries, updates, and reports can be three types of transactions in a database environment. In some examples, one application can perform one type of transaction, and the transaction type identifier can equivalently identify the type of transactions or the application. However, this is not a requirement and, in other examples, one application can perform two or more types of transactions. Moreover, two or more applications can perform a same type of transaction, e.g. one legacy application and one new application.

A "tuple" is an ordered collection of two or more member data items. The members of a tuple can have same or different datatypes, which can be atomic or complex. A "pair" is a tuple with two members and a "triple" is a tuple with three members. A counterpart to a tuple, having a single member, is a "singlet," which is not a tuple.

A "user interface" ("UI") is a physical structure (e.g. display or keyboard) or a software module (e.g. supporting an API or message interface) through which a user of a software application can provide input to the software application or can receive output from the software application. Common user interfaces are graphical user interfaces ("GUI") in which visible indicia or other content is displayed, e.g., on a screen and, optionally, input from the user can be made by navigating, e.g., a pointing device with respect to displayed objects. However, this is not a requirement and the disclosed technologies can be used with other user interfaces, as disclosed herein.

A "version" is an attribute of an instance of an evolving software application, such that two instances of a same version have the same specification for all inputs and outputs, while two instances of different versions have at least one distinction in an input specification or an output specification.

Example Dataflow Diagram

FIG. 1 is an example data flow diagram 100 for migration of one or more extensions from a source environment to a target environment. In data flow diagram 100, operations are shown as circles, while various data objects are shown with other assorted shapes. Dashed cloud-shaped outlines indicate respective computing environments in which extensions can be implemented. Inputs to the dataflow can include one or more libraries 102, which can be target-side libraries containing metadata of software applications and extensions available in a target environment 196, one or more registries 104, which can contain source-side information regarding which extension hooks are available for which contexts, applications, or transaction types in source environment 192, and one or more configuration databases 106. Configuration databases 106 can contain data defining source extensions 108 in source environment 192

Migration of a source extension 108 to a target extension 170 is facilitated by extension migration templates (EMTs) defining a correspondence between certain source extension attributes and corresponding target extension attributes. A single EMT is dubbed an EMT record (e.g. 140), and a collection of such records is dubbed an EMT data structure 120. Construction of EMT data structure 120 can be a prerequisite to actual migration of a given source extension 108.

Process block 115 can retrieve target-side attributes from libraries 102 and can retrieve source-side attributes 104 from registries 104. Some attributes can be common to source and target environments, which can commonly occur in migration scenarios, particularly where an underlying database or other non-migrating infrastructure remain unchanged between source and target environments. Using the common attributes, process block 115 can find matching combinations of source and target attributes, which can subsequently be used as a bridge. Each such set of matching combinations can be an EMT record and such records can collectively form EMT data structure 120. In some examples, EMT data structure 120 can be a table of records, or multiple such tables, e.g. a respective table for each type of extension. However, a tabular implementation is not a requirement, and hierarchical, list, or other data structures can also be used. Further implementation of process block 115 and example EMT records are provided herein, e.g. in context of FIGS. 3-4. EMT data structure 120 can be updated using a similar data flow as for initial construction.

Notably, process block 120 can be performed using source metadata of a base software application. That is, the base software application can include extension hooks, and EMT records can be constructed using knowledge of extension hooks without knowledge of any particular extension coupled thereto in a particular customer deployment of the source software application. EMT data structure 120 can be built by an author of an instant software application without recourse to any private customer data, and can be provided for use in a customer environment such as source environment 196. Alternatively, EMT data structure 120 can be built within a customer's source environment 192.

With EMT data structure 120 available, migration of source extension 108 can proceed. At process block 125, one or more source extension records can be constructed from one or more configuration databases 106 in the source environment. Particularly, process block 125 can retrieve assorted metadata stored in databases 106, including metadata identifying extensions installed in source environment 192, associated extension hooks and applications, and one or more of associated transaction type or context. The metadata for each extension can be collected as a source extension record 130. Often, extensions are implemented in groups and each extension in the group can have a respective source extension record 130. For example, as described herein in context of FIG. 2, a group of extensions can include (i) a dynamic output display component, with associated back-end logic to retrieve the output value to be displayed, (ii) one or more input controls that can link to respective front-end or back-end logic, and (iii) associated static output informational text.

In some examples, source extension record 130 can include a minimal set of information to match against EMT data structure 120. In such examples, additional data required by downstream process blocks can be retrieved by the downstream process block from configuration databases 106. In other examples, source extension record 130 can include additional information, so that e.g. extension migration proposal 150 or a simulated extension 160 can be built directly using information carried forward from source extension record 130 without further recourse to databases 106.

At process block 135, all or part of each source extension record 130 can be matched against the records of EMT data structure 120 to find a matching EMT record 140. In some examples, each source extension can result in a single matching record 140 while, in other examples, multiple matching records can be found for a single source extension record 130. The latter situation can arise when an instant source extension is compatible with multiple versions of a target application, multiple contexts, or multiple target extension hooks.

At process block 145, one source extension record 130 can be transformed using one EMT record 140 to obtain an extension migration proposal 150 for a target extension 170 that can replicate the instant source extension 108. Because extensions 108 can be implemented (and migrated) in groups, in other examples a single proposal 150 can cover a group of extensions 108. Because a single source extension record 130 can have multiple matching EMT records 140 (e.g. for different versions of a target application), one extension or group of extensions 108 can have multiple proposals 150 to choose from. To illustrate, a first proposal 150 can support migration of a group of five extensions 108 to target application version 4.1, while a second proposal 150 can support migration of the same group of extensions 108 to target application version 5.0.

Examples of process blocks 125, 135, 145 with source extension records 130 and extension migration proposals 150, are described further herein, e.g. in context of FIGS. 4-6.

Once a suitable migration proposal 150 has been formulated (and, optionally, confirmed by a user), the data flow can continue to process block 155. As illustrated, process block 155 can receive migration proposal 150 and simulate the corresponding target extension features following the blueprint of migration proposal 150. In examples, block 155 can retrieve additional data, as required, from configuration databases 106, e.g. to identify database values to be displayed in dynamic output fields, to identify back-end logic to be linked to output components, or to identify front-end logic to be linked to input controls. Block 155 can construct and execute the simulated target extension 160 in sandbox environment 194. Thereby, if the migration is unsatisfactory, the proposed extension migration can be discarded before any changes are made in target environment 196. Examples of process block 155 and an illustrative GUI display are described further herein, e.g. in context of FIG. 2 or FIG. 8. In some examples, multiple simulated extensions 160 can be run in sandbox environment 194, for respective extension proposals 150.

Finally, when one or more simulated extensions have been approved, process block 165 can be invoked to generate corresponding one or more extensions 170 within target environment 196. Block 165 can make and commit changes to the target application in target environment 196 to match the approved simulated extensions 160.

For clarity of illustration, the dataflow of FIG. 1 has generally been shown or described without user interaction. As detailed further herein, e.g. in context of FIG. 10, user interaction can occur at various points in the dataflow. For example, an agent of the author of the instant software application can cause EMT data structure 120 to be updated, e.g. upon a new release of the source or target software application.

Example Extension Migration

Figure 2A:
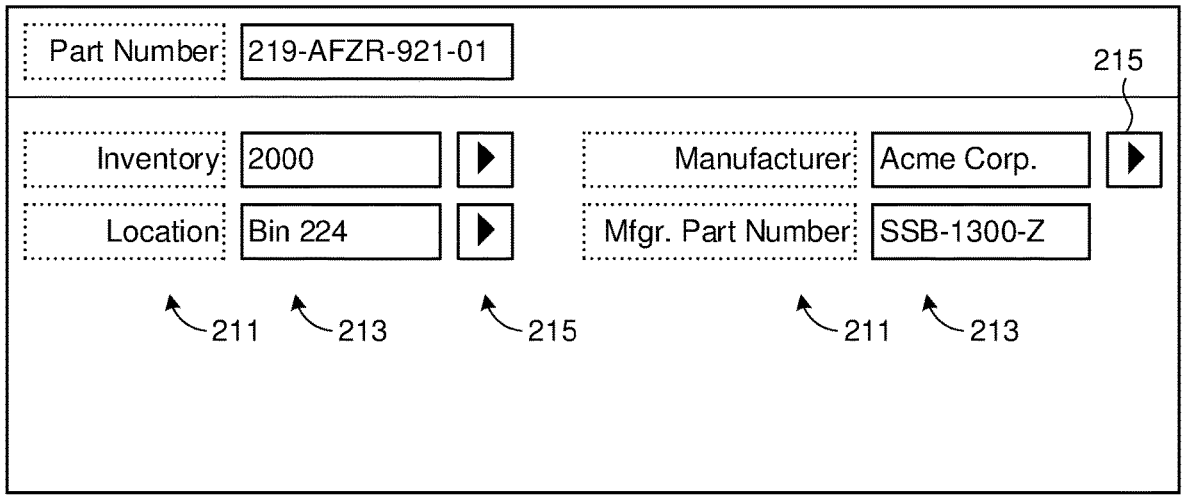
FIGS. 2A-2B are diagrams illustrating example enhancements to an interface according to the disclosed technologies.
Figure 2B:
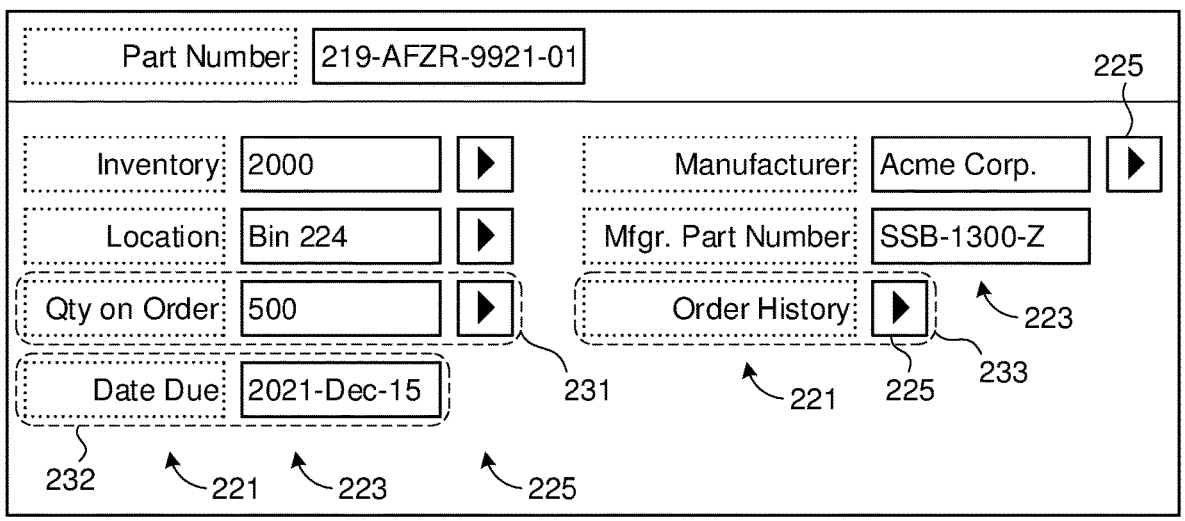

FIGS. 2A-2B are diagrams illustrating example enhancements to an interface for an inventory management software application. FIG. 2A illustrates a page 201 of a GUI of a base target software application, and FIG. 2B illustrates the GUI page 202 after a source extension has been migrated to the target software application. The illustration is made in context of a part record for an inventory database, however similar concepts are applicable to interfaces for other software applications, and to a wide range of database and other software applications, not limited to front-ends or databases. GUI page 201 (or 202) can be one among a plurality of GUI pages of the target software application.

FIG. 2A shows three types of visual components on GUI page 201. Components 213 provide dynamic output content, which provide output functionality of interface 201. Components 211 provide static output content, which in this illustration are user-friendly labels for respective components 213. Static output fields 211 can be maintained in configuration tables associated with the target software application, and can be retrieved therefrom for display. Dynamic output fields often show values stored in an associated database. In this illustration, part number 219-AFZR-921-01 can be a key value, and the values for inventory, location, manufacturer, and manufacturer part number can be retrieved using back-end logic from corresponding database records (e.g. from one or more tables, or from a view) with the part number as the key. In varying examples, a single back-end logic function can support all dynamic output components 213, or each output component 213 can be supported by its own back-end logic function.

Then, components 215 are input controls, selectable, e.g., by point-and-click, or direct touch on a touchscreen. Input controls 215 provide input functionality for interface 201. For example, button 215 adjacent to the inventory display can be linked to another GUI page listing a history of changes or scheduled changes to the inventory quantity, while button 215 for the bin location can be linked to a GUI page showing a map of a warehouse and indicating the location of bin 224. The manufacturer's button 215 can link to a GUI page showing particulars for Acme Corp., including contact information, account status, and other information. GUI page 201 is merely a simplified illustration. Many other types of GUI components are known, including navigation controls, text input boxes, drop-down menus, and so forth.

Turning to FIG. 2B, GUI 202 is the same target-side user interface incorporating several migrated source extensions 231-233. GUI page 202 can be displayed to a user from a sandbox environment by an extension simulator, and can be substantially similar to actual production displays after the extensions are incorporated in the target environment.

Definitions of the extension fields are required in the source environment and can be stored at the source environment in one or more configuration tables. An extension simulator can retrieve these definitions to simulate or implement a migrated extension 231-233 in the sandbox or target environment. For convenience of description, extensions 231-233 depicted in GUI page 202 can be organized as three distinct extensions according to static fields 221, however this is not a requirement, and multiple extensions to a single application or GUI can be organized in numerous ways.

Quantity-on-order record 231 includes a static output 221, a dynamic output 223, and an input control 225. Static output 221 ("Qty on Order") can be retrieved as text from a source configuration table using the source extension name or identifier as a key. For dynamic output 223 ("500"), the source configuration table can include a pair of identifiers according to a database schema, one identifier indicating that a "Part number" field is to be used as a key, and another identifier indicating that the displayed value can be obtained from a corresponding "Qty on Order" field. In some examples, another identifier can be used to designate a particular table name or view name from which the output display value ("500") can be obtained. Regardless of the particular details of identifiers and back-end access, all identifiers or functions required to populate the output display value can be obtained from one or more source configuration tables. In some examples, the instant identifiers can be incorporated into target-side configuration files: once listed therein, target-side UI software can automatically build the display using these identifiers. In other examples, an instant migration proposal can provide a mapping from a source back-end logic function (e.g. obtained from source configuration tables) to a target back-end logic function. Finally, quantity-on-order record 231 can include an input control 225, which can link to a front-end GUI displaying an associated order record. Again, the linked source-side GUI page can be identified from source configuration table and mapped (by an EMT record) to a target-side GUI page, which can be simulated or implemented in the migrated extension in the sandbox or target environment.

GUI page 202 also includes extension records for date-due 232 and order-history 233. Date-due record 232 lacks an input control, but has a static output 221 and a dynamic output 223 which can individually be migrated as described for quantity-on-order record 231 above. Order-history record 233 lacks dynamic output, but has a static output 221 and an input control 225. Again, each of these components can be migrated as described for quantity-on-order record 231.

Example Method for Building an Extension Migration Template Data Structure

Figure 3:
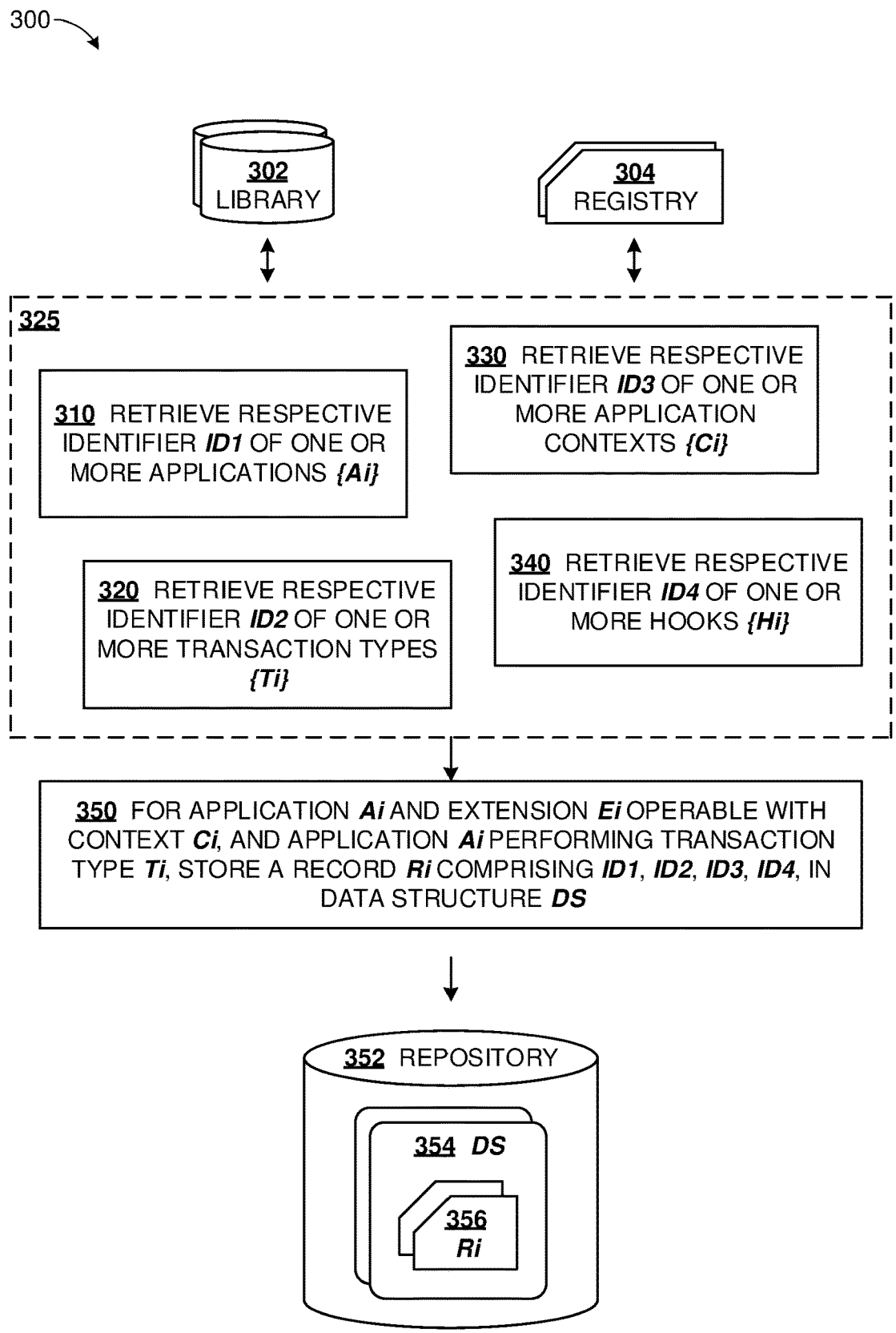
FIG. 3 is a hybrid diagram depicting a flowchart of a method for building an extension migration template data structure, together with associated data objects, according to examples of the disclosed technologies.

FIG. 3 is a diagram 300 depicting a flowchart of a method for building an extension migration template data structure. In this method, a record is constructed containing source-side fields pertaining to a source application and target-side fields pertaining to a target application. The record can be used as a mapping from the source-side fields to the target-side fields. That is, a source extension matching the source-side fields of a given record can be mapped to the target-side fields. A target extension can be developed, based on these target-side fields, that replicates the source extension functionality in a target environment.

At process block 310, respective identifiers ID1 of one or more applications Ai can be retrieved from one or more libraries 302. Collectively, the one or more applications Ai can form a group {Ai}. The target environment can include a number of software applications {Ai}, which can be indexed in the libraries 302. Libraries 302 can be target-side libraries. In some examples, library metadata can include, for each target application Ai, its application identifier ID1, as well as a corresponding transaction type Ti and a corresponding context Ci.

At process block 320, respective identifiers ID2 of one or more transaction types Ti can be retrieved. Collectively, the one or more transaction types Ti can form a group {Ti}. At process block 330, respective identifiers ID3 of one or more application contexts Ci can be retrieved. Collectively, the one or more contexts Ci can form a group of contexts {Ci}. In some examples, identifiers ID2, ID3 can be retrieved from a same library as identifier ID1, but this is not a requirement and differently organized libraries 302 can be used.

At process block 340, respective identifiers ID4 of one or more hooks Hi can be retrieved from one or more registries 304. A hook Hi can be an extension hook of a source software application, through which one or more source extensions can be linked or registered. Collectively, the one or more hooks Hi can form a group of hooks {Hi}. Registries 304 can be source-side registries. For example, a registry 304 can maintain a list of hooks Hi available for each of one or more contexts Ci. That is, a context Ci can describe tables of an underlying database, which can be common between the source and target environments.

As indicated by dashed outline 325, process blocks 310, 320, 330, 340 are not constrained to be performed in a particular order, and different examples can organize these blocks in different ways. In some examples, each application Ai can be used as a key: identifiers ID3 can be retrieved for the one or more contexts Ci of an instant application Ai, and likewise identifiers ID2 can be retrieved for the one or more transaction types of the instant application Ai. In other examples, each transaction type Ti can be used as a key: identifiers ID3 can be retrieved for the context Ci of an instant transaction type Ti, and likewise identifiers ID1 can be retrieved for the one or more applications Ai performing the transaction type Ti. Similarly, each context Ci can be used as a key. In further examples, tuples (Ai, Ci, Ti) can be retrieved directly from library 302, so that blocks 310, 320, 330 are performed concurrently.

Similarly, in some examples, process block 340 can be performed using transaction type Ti, context Ci, or another field as a key. In other examples, tuples (Ti, Hi) can be retrieved directly from registry 304. In further examples, identifier ID3 of context Ci can be retrieved as a source-side context from registry 304 and used as a key to retrieve one or both of identifiers ID1, ID2 of target-side application Ai and transaction type Ti.

At process block 350, the identifiers retrieved at blocks 310, 320, 330, 340 can be collated. If a context Ci has a hook Hi available on the source side, and on the target side the same context Ci supports application Ai performing transaction type Ti, then (Ai, Ti, Ci, Hi) form a tuple. A tuple of the corresponding identifiers (ID1, ID2, ID3, ID4) can be stored as a record 356 in EMT data structure DS 354 stored at a repository 352. Thus, the source side fields can be (ID3, ID4) corresponding to (Ci, Hi) and the target side fields can be (ID1, ID2, ID3) corresponding to (Ai, Ti, Ci).

FIG. 4 is a diagram 400 which illustrates example records 412, 413 of an EMT data structure. Row 411, although generally absent from the EMT data structure, depicts corresponding column labels (which are metadata) and is included for clarity of illustration. In this illustration, row 412 pertains to a front-end extension for a display feature and row 413 pertains to a back-end extension for corresponding supporting logic. Columns 410 are source-side fields including source hook ID4 in column 404. Columns 415 include one or more fields which can be common to source and target environments, such as transaction type identifier ID2 or context identifier ID3 in columns 402, 403. Columns 420 are target-side fields including target-side application identifier ID2 in column 401. Columns 430 are fields which can be used subsequently to match an implemented source extension with one or more rows of the EMT data structure.

As illustrated in FIG. 4, some EMT data structures or records can incorporate additional fields beyond ID1-ID4 in columns 401-404. In this illustration, source-side fields 410 include fields identifying a source-side application ("MM-PUR" for both rows 412-413) and a source extension type, in addition to the source hook ID4 previously discussed. Some hooks can invoke program instructions within a user interface, as indicated by extension type "UI Code" while other hooks can invoke back-end logic (e.g. executable program instructions), as indicated by extension type "Back-end Logic." An EMT record can be generic, without details of any specific extensions implemented in any specific source (or target) environment. Accordingly, columns 410 contain information about available hooks, but not information about any specific instances coupled to those hooks, which can vary from one application instance to another.

As for target-side fields 420, the illustrated EMT data structure includes fields for target application name and target hook name, which provide secondary identification of a target application and a name of an available hook, respectively. A target extension type field indicates that target hook View-1 of row 412 can be implemented as an "include" feature of a user interface (e.g. a string or a file to be included in a user interface definition file, which can result in the object of the include string or file being automatically built into a user interface display). Target hook Get-1 can be implemented by back-end program instructions as indicated by extension type "Back-end Logic". Additionally, fields 420 can include column 405 indicating a first version of an instant target application supporting an instant EMT record. The first version can be used subsequently to ensure that a proposed migration is compatible with a source application version in a particular source environment. While application updates can often be backward compatible, this is not a requirement and, in other examples, another column can be included for "last version," to indicate that a given EMT record is not supported after a particular application version.

Turning back to FIG. 3, numerous extensions and variations of the depicted method can be implemented. Application Ai, corresponding to identifier ID1 of a given tuple 356, can be a front-end application, such as a user interface application of a database environment. In varying examples, extension hook Hi, corresponding to identifier ID4 of the given tuple 356, can be a hook linking to a front-end extension or to a back-end extension.

In some examples, a migration process can include analyzing a source application having a source extension to obtain a source record, and retrieving a matching record for the source record from the EMT data structure. The source record and matching record can have (ID2, ID4) in common, corresponding to (Ti, Hi). Then, a migration proposal can be formulated based on ID1 of the matching record, corresponding to target-side application Ai. A configuration database of the source software application can be used to implement the migration proposal. Fields utilized by the source extension can be retrieved from the configuration database and can be bound to the target-side application Ai.

In additional examples, library 302 can store a tuple (ID1, ID2) corresponding to (Ai, Ti). Retrieving identifier ID2 of transaction type Ti can be performed using ID1 as a key to retrieve ID2 from the tuple (ID1, ID2). Repository 304 can store a tuple (ID3, ID4) corresponding to (Ci, Hi). Retrieving identifier ID4 of hook Hi can be performed using ID3 as a key to retrieve ID4 from the tuple (ID3, ID4).

In an update operation, storing EMT record 356 in EMT data structure 354 can overwrite an earlier record 356 present in data structure 354. While FIG. 3 illustrates multiple records 356 within EMT data structure 354, this is not a requirement. In some examples, a single record 356 can itself be an EMT data structure.

Example Method for Formulating an Extension Migration Proposal

FIG. 5 is a flowchart 500 of an example method for formulating an extension migration proposal. In this method, a source application is analyzed, and a resulting record for an extension of the source application is matched against an EMT data structure to find a matching EMT record. Target fields of the matching record are used to formulate a migration of the source extension to a target environment. The source application can be a front-end application for a database environment.

At process block 510, a source front-end application A1 can be analyzed to generate one or more source records R1 for respective extensions. Each source record R1 can have at least (i) a first field FE1 representing a source extension E1 implemented in the source front-end application A1; (ii) a second field FH1 representing a source hook H1 (in application A1) through which the source extension E1 is implemented; and (iii) a third field FT1 representing a corresponding transaction type T1.

FIG. 6 is a diagram 600 which illustrates example records of an analyzer output according to the disclosed technologies. In FIG. 6, two records 612, 613 are shown along with a row 611 of descriptive column labels. Row 611 can generally be absent from the analyzer output, but is shown in FIG. 6 for clarity of illustration. In this illustration, row 612 describes a display (front-end) extension named PPC007EXT which can cause a display screen to be augmented with a computed quantity. Row 613 describes back-end logic named GET007LOGIC to support the PPC007EXT front-end extension. Extension GET007LOGIC can compute the quantity to be displayed using the PPC007EXT extension. For each record 612, 613, the first field representing the corresponding source extension can be the source extension name in column 606. The second field representing the corresponding source hook can be source hook identifier ID4 in column 602, and the third field representing the transaction type can be the transaction type identifier ID2 in column 603.

Turning back to FIG. 5, at block 520, the source records {R1} can be compared with target records {R2} to determine one or more matches M12. Each target record R2 can have a fourth field FH2 representing a target hook H2 available in a target application A2, a fifth field FT2 representing a target transaction type T2, and a sixth field FA2 representing the target application A2. A source record R1 and a target record R2 can match when source field FT1 matches target field FT2 (e.g. FT1 and FT2 have the same value) and source field FH1 matches target field FH2 (e.g. FH1 and FH2 have the same value). In some examples, target records R2 556 can be obtained from a EMT data structure 554 stored at repository 552.

With reference to FIGS. 4-6, matching can be performed between the set of source fields 630 and a corresponding set of target fields 430. As illustrated, source record 612 matches target record 412, because both have hook ID4=PPC007 and both have transaction type ID2=ME21N. Similarly, source record 613 matches target record 413, because both have hook ID4=GET007 and both have transaction type ID2=ME21N.

Turning back to FIG. 5, at block 530, match M12 can be used to formulate a migration proposal X12 from extension E1 of the matched source record R1 to the target application A2 of matching target record R2, using hook H2 of target record R2.

Figure 7:
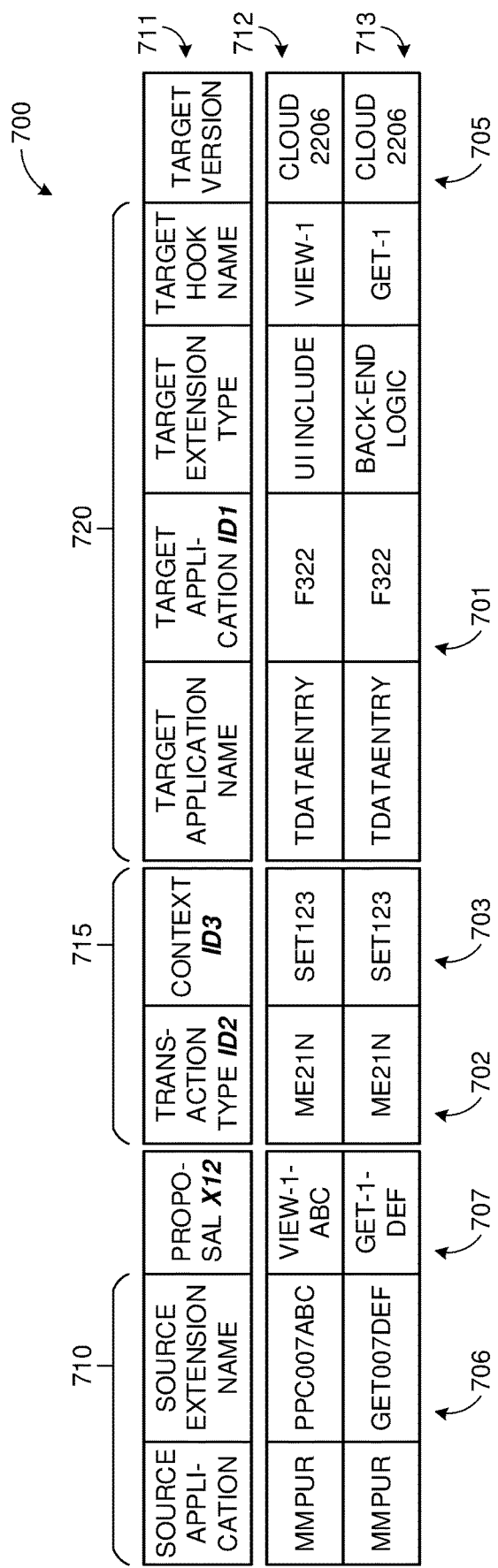
FIG. 7 is a diagram depicting example proposals for migrating extensions according to the disclosed technologies.

FIG. 7 is a diagram 700 depicting example proposals 712, 713 for migrating the extensions of FIG. 4 rows 412, 413. Descriptive column labels in row 711 are also shown. Columns 710 are source-side fields identifying what is being migrated, such as extension PPC007ABC (in column 706) of source application MMPUR for row 712, which match corresponding fields of source record 612. Column 707 assigns an identifier to the target extension proposal X12. In some examples, the same name X12 can persist from a proposal of a target extension to its eventual commit in the target environment.

The remaining columns are target-side identifiers, including columns 715, corresponding to columns 415 of FIG. 4, and columns 720, which can be a subset of columns 420. These columns include target application identifier ID1 in column 701, transaction type identifier ID2 in column 702, and context identifier ID3 in 703. Column 705 indicates a version for an instant target application that is proposed for an instant extension migration. This target version can be chosen to be (i) within the range of validity of an instant EMT record, as indicated in column 405 of FIG. 4, and (ii) compatible with an instant source application version, as indicated in column 605 of FIG. 6. In some examples, the target version 705 can be chosen automatically at block 530, e.g. as the most recent version of the target application that satisfies conditions (i) and (ii), while in other examples, a user can be prompted to select the target application version 705. In further examples, a given match M12 between a source record (e.g. 612) and an EMT record (e.g. 412) can result in multiple proposals being generated for respective target application versions 705.

Certain columns and fields are shown explicitly in FIG. 7 for clarity of illustration but can be omitted from a proposal record in other examples. To illustrate, one or both of source application name and source extension name can be indirectly referenced, e.g. using proposal identifier X12, separately from records 712, 713.

Numerous extensions and variations of this method can be implemented. Block 510 can be implemented with program instructions installed in a customer computing environment. Analysis of the source application can include retrieval of private data within the customer environment. Block 510 can be performed in response to a request from a client to migrate the source front-end application A1 to a target environment which includes the target application A2. Process block 530 can include presenting the migration proposal X12 to the requesting client, for approval.

Process block 510 can include determining a version of the source front-end application (as shown in column 605 of FIG. 6). Selection of target application A2 can be based at least partly on the version 605. For example, matching at block 520 can be restricted to those rows of an EMT data structure 400 having a target version (as shown in column 405 of FIG. 4) known to be compatible with source version 605. The source front-end application and the target application can each implement at least portions of a graphical user interface for a database environment. In some situations, block 520 can fail to find a matching target record among {R2} for one or more source extension records R1. In such a case, a service request can be transmitted to a management host of the target application, which can result in development of additional facilities for the target application.

Example Method for Simulating an Extension Migration Proposal

Figure 8:
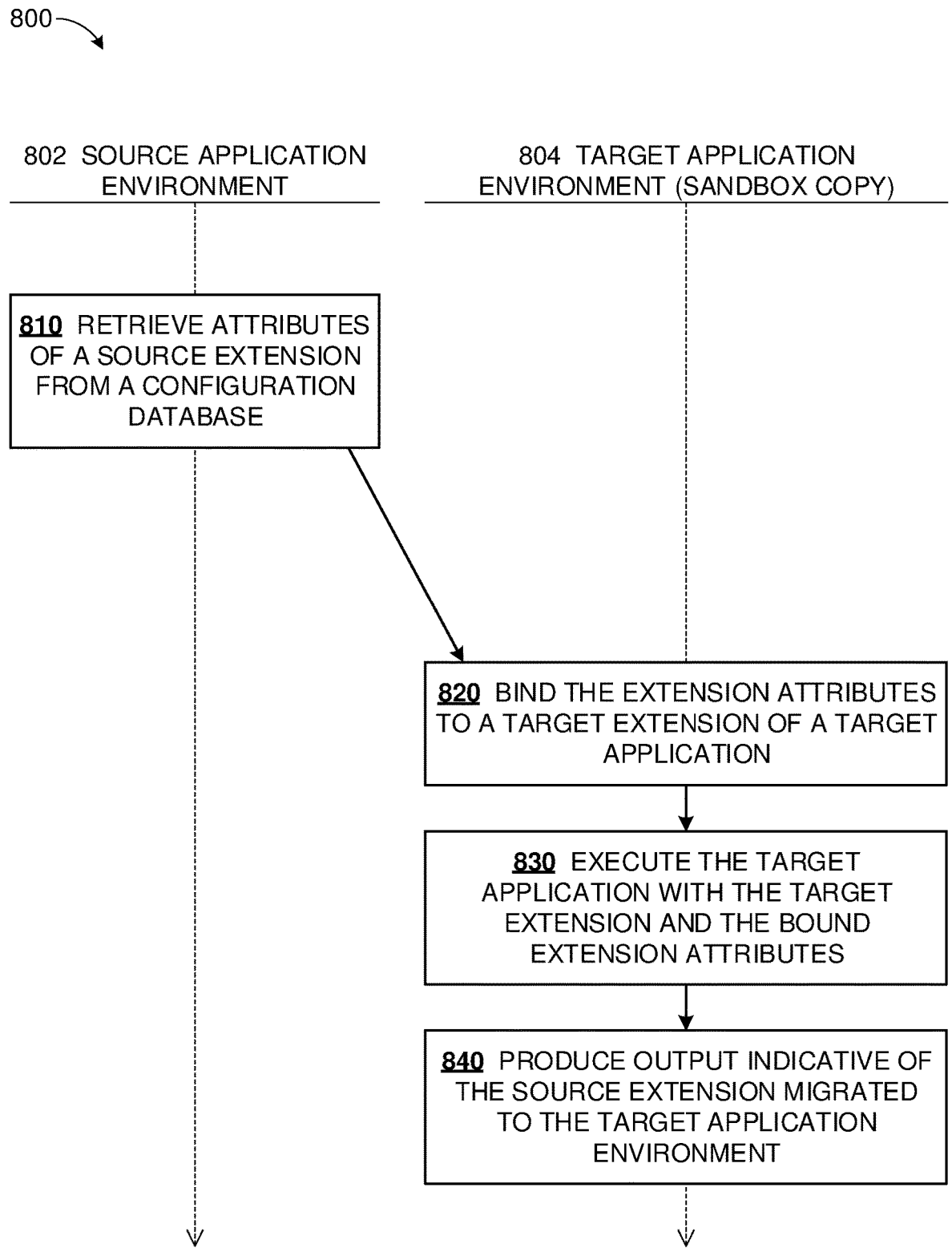
FIG. 8 is a flowchart of an example method for simulating an extension migration proposal according to the disclosed technologies.

FIG. 8 is a flowchart 800 of an example method for simulating an extension migration proposal according to the disclosed technologies. Flowchart 800 is shown in two swim lanes, the left lane 802 depicting an action performed in a source application environment, and the right lane 804 depicting actions performed in a target application environment. While there is no prohibition on performing these actions in a production target environment, in some examples it can be preferable to use a sandbox facsimile of the target environment so that the proposed migration can be verified prior to being committed. Time proceeds downward in both swim lanes 802, 804.

The method can commence with an identified migration proposal, for migration of a given (source) extension of a given version of a source application to a corresponding extension of another given version of a target application. At block 810, attributes defining the source extension can be retrieved from a configuration database. These attributes are described further herein, e.g. in context of FIG. 2B.

With all attributes of the source extension identified, the method proceeds to the target application environment in lane 804. At block 820, the extension attributes can be bound to a target extension of the target application. At block 830, the target application can be executed with the target extension and the bound extension attributes. Then, at block 840, output indicative of the migrated extension (in the target application environment 804) can be produced.

Numerous variations and extension of this method can be implemented within scope of the disclosed technologies. In some examples, the simulated migration can be according to a proposal that has been presented to a user, and the method can be triggered by the user's approval of the proposal. In further examples, the output generated at block 840 can be presented to the user, and upon the user's approval of the presented output, the bound extension fields of the target extension can be committed to the target application. In some examples, where block 830 is performed in a production target environment, the commit can be simply a commit of changes already made. In other examples, where block 830 is performed in a sandbox copy of the target environment, the commit can include replication of the sandbox extension features (e.g. program code or configuration data) to the production target environment.

In further examples, the instant proposal can be obtained by additional operations not shown in FIG. 8. A first record containing one or more attributes of the source extension can be obtained, e.g. from an upstream software module. The first record can be similar to a source extension record described herein. A second record can be identified that is a match to the first record. The match can be identified based on a predetermined subset of fields in the first and second record, each of which can have distinct additional fields not subject to the match. The second record can be identified from among a table of similar records. The table can be similar to an EMT data structure described herein, and the second record can be similar to an EMT record. Then, fields of the matching first and second records can be combined to obtain the instant proposal for migration of the source extension.

The source extension can be a front-end source extension requiring back-end logic support. In varying examples, the supporting back-end logic can provide retrieval of a value to be displayed in an output display component, or the supporting back-end logic can perform functions in response to activation of an input control. Non-limiting examples of back-end functions can include queries, report generation, updates to database records, or maintenance functions. In some examples, the source and target applications can be user interfaces to an underlying database environment. The migration can be from a legacy UI to a modern user experience (UX) paradigm.

Example Architecture Diagram

Figure 9:
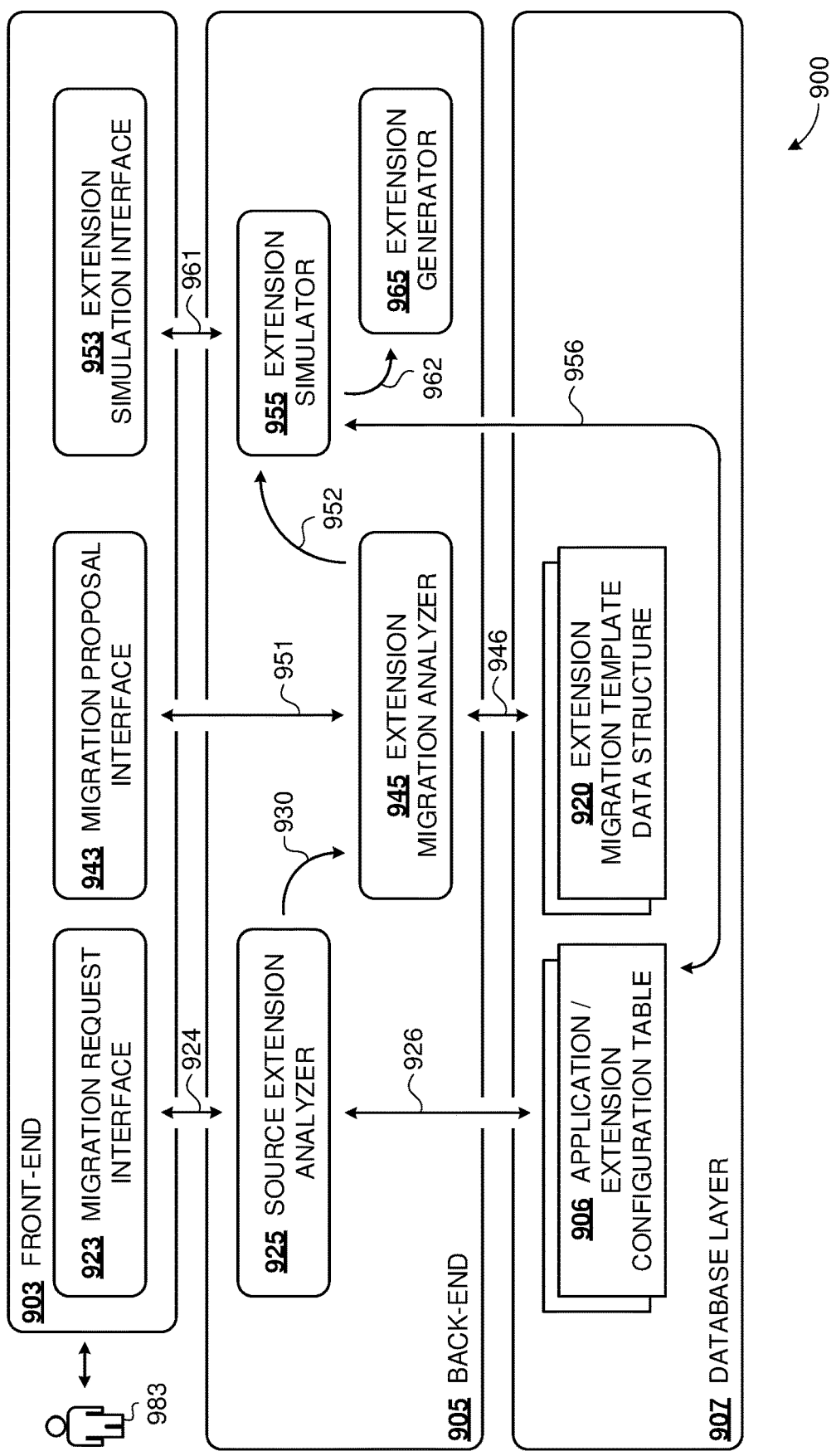
FIG. 9 is an architecture diagram according to examples of the disclosed technologies.

FIG. 9 is an architecture diagram 900 for an example implementation of the disclosed technologies. Like many software applications, the disclosed technologies can be implemented in a three-layer architecture, comprising front-end and back-end components, together with an underlying database layer. Within these layers, several software modules are shown with rounded corners. Data objects in the underlying database layer are shown as rectangles with square corners.

User 983 can interact with front-end layer 903 at various stages of extension migration. Initially, user 983 can submit a request to migrate one or more software extensions (in some cases, all software extensions of a given software application) via migration request interface 923. The request can be forwarded to back-end 905 (arrow 924), triggering source extension analyzer 925. Analyzer 925 can perform functions similar to those described in context of blocks 125 or 510 herein, retrieving source extension attributes from configuration database 906 in database layer 907 (arrow 926), to produce one or more source extension records which can be conveyed (arrow 930) to extension migration analyzer 945.

Extension migration analyzer 945 can identify one or more records in EMT data structure 920 (arrow 946) that match source extension records received from source extension analyzer 925. Fields of the matching record(s) and the source extension record(s) can be combined to obtain a migration proposal which can be displayed to user 983 via migration proposal interface 943 (arrow 951) in front-end layer 903. Upon approval by user 983, the approved proposal (in some examples, one or more proposals selected by user 983 out of a larger number of migration proposals) can be relayed to extension simulator 955 (arrow 952). Simulator 955 can access additional extension attributes from database 906 (arrow 956) to create and run a simulation of the proposed migrated extension in a sandbox environment. Output of the sandbox simulation can be displayed to user 983 via extension simulation interface 953 (arrow 961). Upon approval by user 983, the simulated extension can be forwarded to extension generator 965, to be replicated and committed in the target environment.

Example Method for Migrating an Extension

Figure 10:
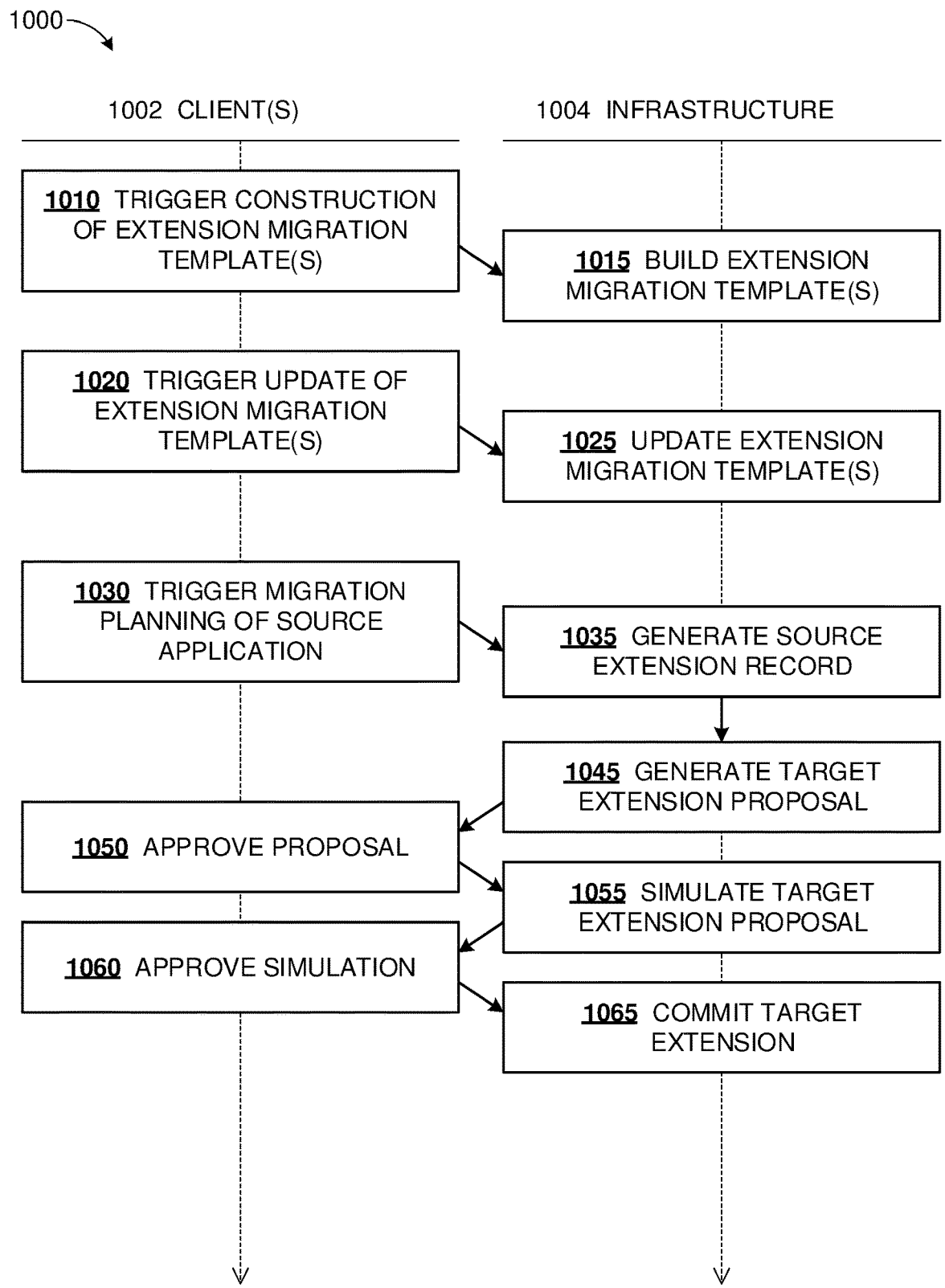
FIG. 10 is a flowchart of an example method for migrating an extension according to the disclosed technologies.

FIG. 10 is a flowchart 1000 of an example method for migrating an extension according to the disclosed technologies. Flowchart 1000 is shown as two swim lanes. The left lane 1002 depicts actions performed by one or more clients, while the right lane depicts actions performed within infrastructure 1004 implementing the disclosed technologies. Such infrastructure is described further herein, e.g. in context of FIG. 9. Although shown as a single lane, the actions of lane 1002 can be implemented by multiple actors. Likewise, the actions of lane 1004 can also be implemented by multiple actors. Time generally proceeds downward in FIG. 10.

Process blocks 1010, 1015 depict building of one or more EMT records or data structures. At block 1010, a client-side operation can trigger construction of the EMT record(s) or data structure(s), and the construction can be performed by infrastructure 1004 at block 1015. Examples of block 1015 are described further herein, e.g. in context of FIGS. 3-4.

Process blocks 1020, 1025 depict update of one or more EMT records or data structures. At block 1020, a client-side operation can trigger update of the EMT record(s) or data structure(s), and the update can be performed by infrastructure 1004 at block 1025. Updates can variously add new records to an existing data structure, modify existing records, or delete records from the data structure. Deletion can happen when a target application is taken out of service. Process blocks 1020, 1025 can be regularly performed as new features are released in the target environment.

The operations of blocks 1010-1025 can be preparation for migration of a given source extension, the migration being described below with reference to blocks 1030-1065.

At block 1030, a client-side operation triggers migration planning of a source application, as a result of which blocks 1035, 1045 can be performed in the infrastructure 1004. At block 1035, a source extension record can be generated, with operation and output similar to that described herein in context of block 510 of FIG. 5, or FIG. 4. At block 1045, a proposal for a target extension can be generated, with operation and output similar to that described herein in context of blocks 520, 530 of FIG. 5, or FIG. 6.

Block 1045 can result in presentation of the target extension proposal to a client in lane 1002. The client can provide approval of the proposal at block 1050, causing the method to return to infrastructure lane 1004. At block 1055, the target extension proposal can be simulated, with operation and output similar to that described herein in context of FIG. 2 or FIG. 8.

Block 1055 can result in presentation of simulation output to a client in lane 1002. The client can provide approval of the proposal at block 1060, causing the method to return to infrastructure lane 1004. At block 1065, the simulated target extension can be committed in the target application environment.

Numerous variations and enhancements of this method can be implemented. In some examples, trigger operations 1020, 1030 can be the same operation. That is, the first operation in migration planning can be to ensure that all EMTs are up-to-date, at block 1025, following which the method can proceed directly to block 1035. In some examples, all operations in client lane 1002 can be performed by agents of a customer and all operations in client lane 1004 can be performed in customer environments, which can include a source environment, a target environment, a sandbox environment, and/or a migration planning environment. Furthermore, a single computing environment can perform any two or more of these roles. Customer environments can be data center or cloud computing environments.

In other examples, blocks 1010-1025 can be performed by an author of a software application or their associated computing environments, without recourse to knowledge of specific extensions or other private data in any customer environment. Blocks 1030-1060 can be performed on the customer-side.

A Generalized Computer Environment

Figure 11:
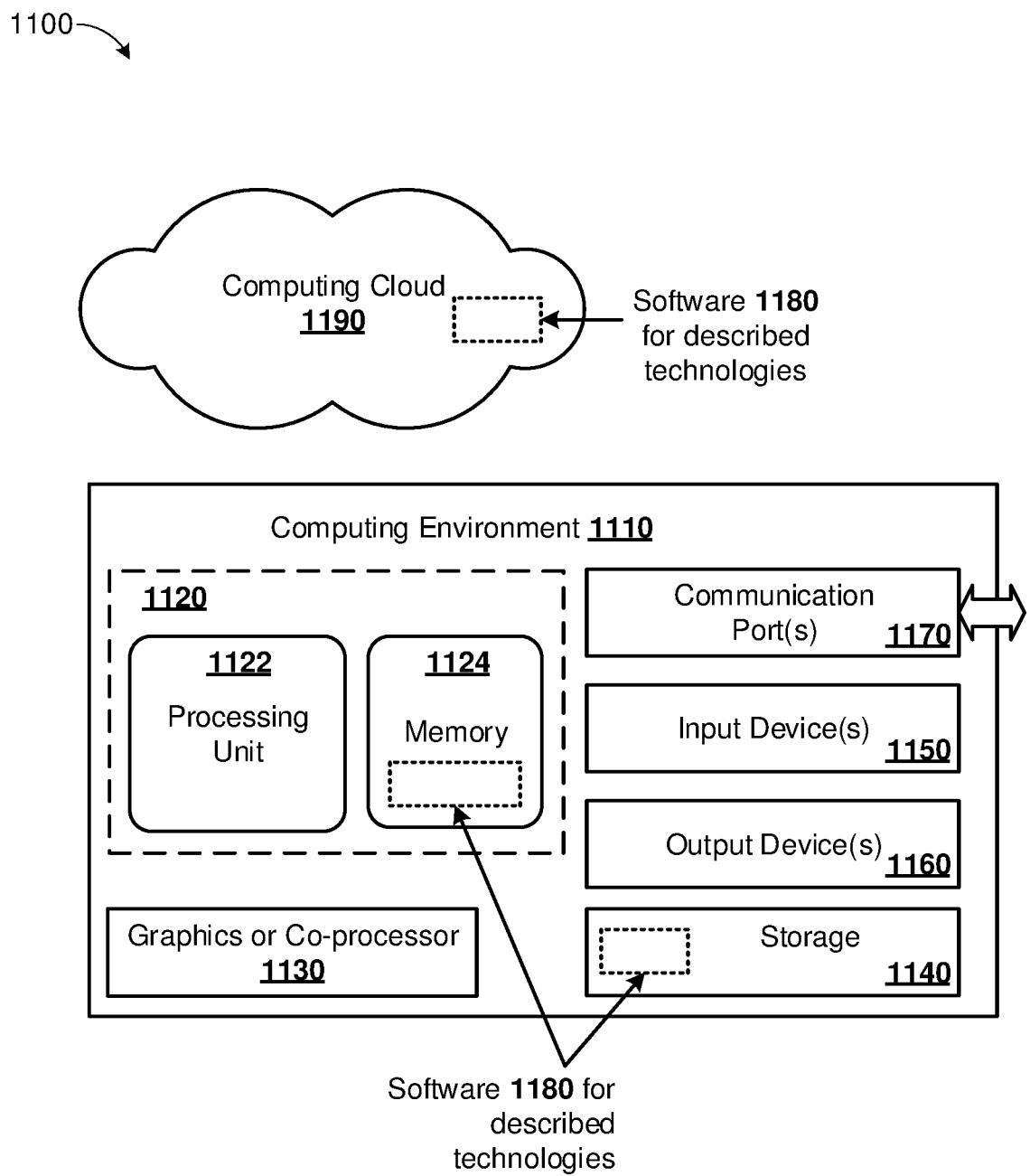
FIG. 11 is a diagram schematically depicting a computing environment suitable for implementation of disclosed technologies.

FIG. 11 illustrates a generalized example of a suitable computing system 1100 in which described examples, techniques, and technologies, including construction, deployment, operation, and maintenance of infrastructure for migration of software extensions, or software components thereof, can be implemented according to disclosed technologies. The computing system 1100 is not intended to suggest any limitation as to scope of use or functionality of the present disclosure, as the innovations can be implemented in diverse general-purpose or special-purpose computing systems.

With reference to FIG. 11, computing environment 1110 includes one or more processing units 1122 and memory 1124. In FIG. 11, this basic configuration 1120 is included within a dashed line. Processing unit 1122 executes computer-executable instructions, such as for implementing any of the methods or objects described herein for migrating extensions to software applications, including construction and maintenance of EMT records, or various other architectures, software components, handlers, managers, modules, or services described herein. Processing unit 1122 can be a general-purpose central processing unit (CPU), a processor in an application-specific integrated circuit (ASIC), or any other type of processor. In a multi-processing system, multiple processing units execute computer-executable instructions to increase processing power. Computing environment 1110 can also include a graphics processing unit or co-processing unit 1130. Tangible memory 1124 can be volatile memory (e.g., registers, cache, or RAM), non-volatile memory (e.g., ROM, EEPROM, or flash memory), or some combination thereof, accessible by processing units 1122, 1130. The memory 1124 stores software 1180 implementing one or more innovations described herein, in the form of computer-executable instructions suitable for execution by the processing unit(s) 1122, 1130. The memory 1124 can also store configuration data for software extensions in source or target environments; EMT records or data structures; source extension records, migration proposals; extension simulation outputs; other configuration data, data structures including data tables, working tables, change logs, output structures, data values, indices, or flags, as well as other operational data.

A computing system 1110 can have additional features, such as one or more of storage 1140, input devices 1150, output devices 1160, or communication ports 1170. An interconnection mechanism (not shown) such as a bus, controller, or network interconnects the hardware components of the computing environment 1110. Typically, operating system software (not shown) provides an operating environment for other software executing in the computing environment 1110, and coordinates activities of the hardware and software components of the computing environment 1110.

The tangible storage 1140 can be removable or non-removable, and includes magnetic disks, magnetic tapes or cassettes, CD-ROMs, DVDs, or any other medium which can be used to store information in a non-transitory way and which can be accessed within the computing environment 1110. The storage 1140 stores instructions of the software 1180 (including instructions and/or data) implementing one or more innovations described herein.

The input device(s) 1150 can be a mechanical, touch-sensing, or proximity-sensing input device such as a keyboard, mouse, pen, touchscreen, trackball, a voice input device, a scanning device, or another device that provides input to the computing environment 1110. The output device(s) 1160 can be a display, printer, speaker, optical disk writer, or another device that provides output from the computing environment 1110.

The communication port(s) 1170 enable communication over a communication medium to another computing device. The communication medium conveys information such as computer-executable instructions or other data in a modulated data signal. A modulated data signal is a signal that has one or more of its characteristics set or changed in such a manner as to encode information in the signal. By way of example, and not limitation, communication media can use an electrical, optical, RF, acoustic, or other carrier.

In some examples, computer system 1100 can also include a computing cloud 1190 in which instructions implementing all or a portion of the disclosed technologies are executed. Any combination of memory 1124, storage 1140, and computing cloud 1190 can be used to store software instructions or data of the disclosed technologies.

The present innovations can be described in the general context of computer-executable instructions, such as those included in program modules, being executed in a computing system on a target real or virtual processor. Generally, program modules or software components include routines, programs, libraries, software objects, classes, data structures, etc. that perform tasks or implement particular abstract data types. The functionality of the program modules can be combined or split between program modules as desired in various embodiments. Computer-executable instructions for program modules can be executed within a local or distributed computing system.

The terms "system," "environment," and "device" are used interchangeably herein. Unless the context clearly indicates otherwise, none of these terms implies any limitation on a type of computing system, computing environment, or computing device. In general, a computing system, computing environment, or computing device can be local or distributed, and can include any combination of special-purpose hardware and/or general-purpose hardware and/or virtualized hardware, together with software implementing the functionality described herein. Virtual processors, virtual hardware, and virtualized devices are ultimately embodied in a hardware processor or another form of physical computer hardware, and thus include both software associated with virtualization and underlying hardware.

Example Cloud Computing Environment

Figure 12:
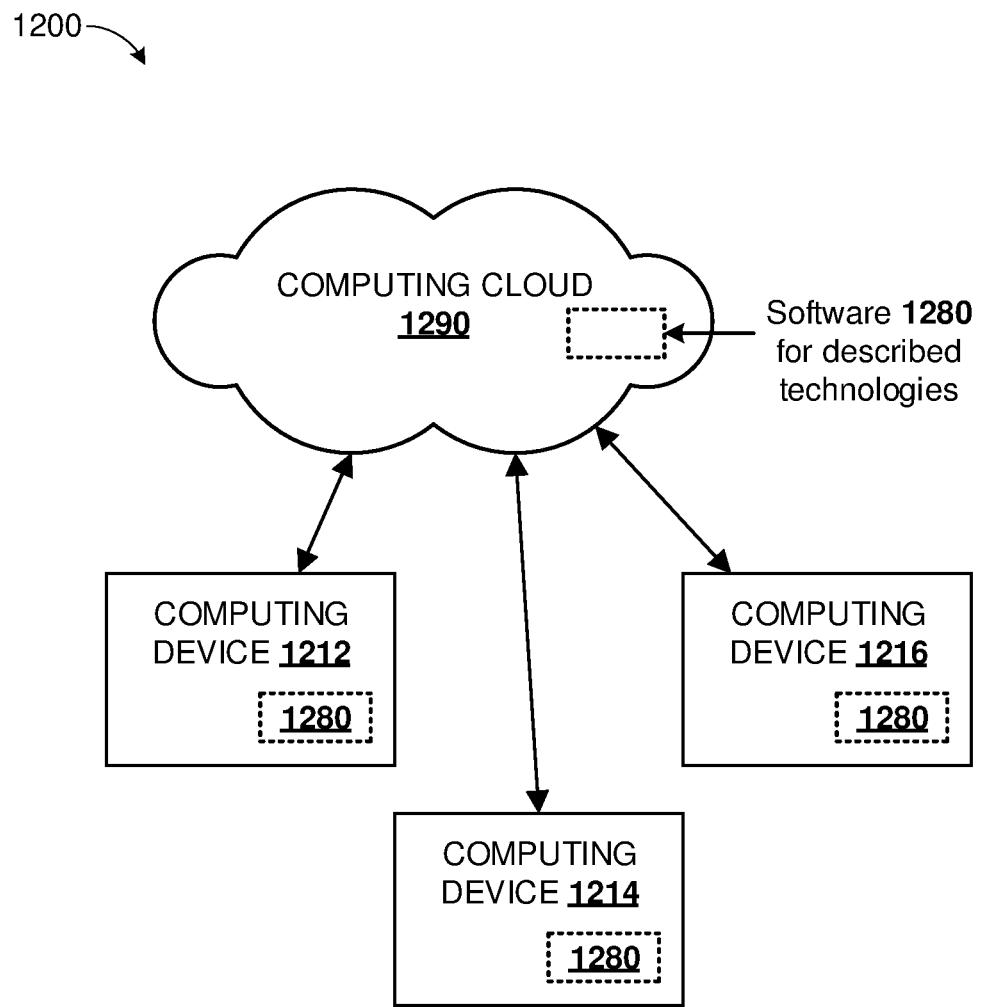
FIG. 12 is a diagram schematically depicting computing devices operating in conjunction with a computing cloud for implementation of disclosed technologies.

FIG. 12 depicts an example cloud computing environment 1200 in which the described technologies can be implemented. The cloud computing environment 1200 comprises a computing cloud 1290 containing resources and providing services. The computing cloud 1290 can comprise various types of cloud computing resources, such as computer servers, data storage repositories, networking resources, and so forth. The computing cloud 1290 can be centrally located (e.g., provided by a data center of a business or organization) or distributed (e.g., provided by various computing resources located at different locations, such as different data centers and/or located in different cities or countries).

The computing cloud 1290 can be operatively connected to various types of computing devices (e.g., client computing devices), such as computing devices 1212, 1214, and 1216, and can provide a range of computing services thereto. One or more of computing devices 1212, 1214, and 1216 can be computers (e.g., servers, virtual machines, embedded systems, desktop, or laptop computers), mobile devices (e.g., tablet computers, smartphones, or wearable appliances), or other types of computing devices. Communication links between computing cloud 1290 and computing devices 1212, 1214, and 1216 can be over wired, wireless, or optical links, or any combination thereof, and can be short-lived or long-lasting. Communication links can be continuous or sporadic. These communication links can be stationary or can move over time, being implemented over varying paths and having varying attachment points at each end. Computing devices 1212, 1214, and 1216 can also be connected to each other.

Computing devices 1212, 1214, and 1216 can utilize the computing cloud 1290 to obtain computing services and perform computing operations (e.g., data processing, data storage, and the like). Particularly, software 1280 for performing the described innovative technologies can be resident or executed in the computing cloud 1290, in computing devices 1212, 1214, and 1216, or in a distributed combination of cloud and computing devices.

General Considerations

As used in this disclosure, the singular forms "a," "an," and "the" include the plural forms unless the surrounding language clearly dictates otherwise. Additionally, the terms "includes" and "incorporates" mean "comprises." Further, the terms "coupled" or "attached" encompass mechanical, electrical, magnetic, optical, as well as other practical ways of coupling items together, and does not exclude the presence of intermediate elements between the coupled items. Furthermore, as used herein, the terms "or" and "and/or" mean any one item or combination of items in the phrase.

Although the operations of some of the disclosed methods are described in a particular, sequential order for convenient presentation, it should be understood that this manner of description encompasses rearrangement, unless a particular ordering is required by specific language set forth below. For example, operations described sequentially can in some cases be rearranged or performed concurrently. Moreover, for the sake of simplicity, the attached figures may not show the various ways in which the disclosed things and methods can be used in conjunction with other things and methods. Additionally, the description sometimes uses terms like "add," "analyze," "append," "bind," "build," "call," "change," "combine," "commit," "compute," "configure," "construct," "delete," "determine," "display," "evaluate," "execute," "extract," "formulate," "generate," "group," "identify," "implement," "input," "link," "map," "match," "migrate," "modify," "obtain," "output," "perform," "receive," "remove," "replace," "replicate," "request," "return," "retrieve," "select," "send," "simulate," "store," "test," "transform," "transmit," "update," or "use" to indicate computer operations in a computer system. These terms denote actual operations that are performed by a computer. The actual operations that correspond to these terms will vary depending on the particular implementation and are readily discernible by one of ordinary skill in the art.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Any of the disclosed methods can be implemented as computer-executable instructions or a computer program product stored on one or more computer-readable storage media, such as tangible, non-transitory computer-readable storage media, and executed on a computing device (e.g., any available computing device, including tablets, smartphones, or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 11, computer-readable storage media include memory 1124, and storage 1140. The terms computer-readable storage media or computer-readable media do not include signals and carrier waves. In addition, the terms computer-readable storage media or computer-readable media do not include communication ports (e.g., 1170) or communication media.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network, a cloud computing network, or other such network) using one or more network computers.

For clarity, only certain selected aspects of the software-based implementations are described. Other details that are well known in the art are omitted. For example, it should be understood that the disclosed technologies are not limited to any specific computer language or program. For instance, the disclosed technologies can be implemented by software written in ABAP, Adobe Flash, Angular, C, C++, C #, Curl, Dart, Fortran, Go, Java, JavaScript, *Julia*, Lisp, Matlab, Octave, Perl, Python, R, Ruby, SAS, SPSS, WebAssembly, any derivatives thereof, or any other suitable programming language, or, in some examples, markup languages such as HTML or XML, or in any combination of suitable languages, libraries, and packages. Likewise, the disclosed technologies are not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, infrared, and optical communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved. The technologies from any example can be combined with the technologies described in any one or more of the other examples.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A computer-implemented method for building or maintaining an extension migration template data structure, comprising:

retrieving, from one or more libraries, a respective first identifier of each application of a first group of one or more applications;

retrieving a respective second identifier of each transaction type of a second group of one or more transaction types;

retrieving a respective third identifier of each context of a third group of one or more application contexts, the each context being a collection of one or more data structures, of a database environment, supporting at least one of the applications;

retrieving, from one or more registries, a respective fourth identifier of each hook of a fourth group of one or more hooks; and for each of one or more tuples, the each tuple comprising a corresponding application of the first group, a corresponding transaction type of the second group, a corresponding context of the third group, and a corresponding hook of the fourth group:

storing, in the extension migration template data structure, a record comprising:

the respective first identifier of the corresponding application;

the respective second identifier of the corresponding transaction type;

the respective third identifier of the corresponding context; and the respective fourth identifier of the corresponding hook;

wherein the corresponding application and the corresponding hook are operable with the corresponding context, and the corresponding application performs the corresponding transaction type;

wherein the extension migration template data structure is operable to map attributes of a source extension of a source application in a source environment to a target environment, the source and target environments each interfaced with the database environment, for:

modification of a target application in the target environment; and execution of the modified target application, to replicate functionality of the source application and source extension in the target environment.

2. The computer-implemented method of claim 1 wherein, for at least one of the one or more tuples, the corresponding application is a front-end application and the corresponding hook links to a back-end extension.

3. The computer-implemented method of claim 1 wherein, for at least one of the one or more tuples, the corresponding application is a front-end application and the corresponding hook links to a front-end extension.

4. The computer-implemented method of claim 1, further comprising:

in a migration process, analyzing a source software application having a source extension to obtain a source record;

retrieving a matching record from the extension migration template data structure, wherein the source record comprises the second and fourth identifiers of the matching record; and formulating a migration proposal for the source extension based on the corresponding application of the matching record.

5. The computer-implemented method of claim 4, further comprising implementing the migration proposal by:

retrieving fields of the source extension from a configuration database of the source software application; and binding the retrieved fields to the corresponding application of the matching record.

6. The computer-implemented method of claim 1 wherein:

for a given application of the first group, the respective first identifier is a given first identifier;

for a given transaction type of the second group, the respective second identifier is a given second identifier;

the one or more libraries store a first mapping between the given first identifier and the given second identifier;

the retrieving the respective second identifier of the given transaction type comprises using the given first identifier as a key to retrieve the given second identifier from the first mapping;

for a given application context of the third group, the respective third identifier is a given third identifier;

for a given hook of the fourth group, the respective fourth identifier is a given fourth identifier;

the one or more registries store a second mapping between the given third identifier and the given fourth identifier; and the retrieving the respective fourth identifier of the given hook comprises using the given third identifier as a key to retrieve the given fourth identifier from the second mapping.

7. The computer-implemented method of claim 1 wherein, for at least one of the one or more tuples, the storing the record comprises replacing an earlier record in the extension migration template data structure.

8. The computer-implemented method of claim 1 wherein the one or more applications of the first group are user interface applications of a database environment.

9. One or more computer-readable media storing instructions executable by one or more hardware processors, the instructions comprising:
- first instructions which, when executed, analyze a source front-end application and generate one or more source records, each of the source records comprising a first field representing a source extension implemented in the source front-end application, a second field representing a source hook through which the source extension is implemented, and a third field representing a corresponding source transaction type;
- second instructions which, when executed, compares the one or more source records with target records to determine one or more matches, each target record comprising a fourth field representing a target hook available in a target application, a fifth field representing a target transaction type, and a sixth field representing the target application;
- wherein each match of the one or more matches indicates a given source record and a given target record, and is determined based on the second and fourth fields being matched and the third and fifth fields being matched; and
- third instructions which, when executed, formulate, based on at least a given one of the one or more matches, a proposed migration of the source extension represented by the first field, using the target application represented by the sixth field and the target hook represented by the fourth field;
- wherein, upon approval of the proposed migration, fourth instructions are generated to modify the target application; and
- wherein execution of the fourth instructions generates, in a target environment, output replicating functionality of the source extension.

10. The one or more computer-readable media of claim 9, wherein the first instructions are installed in a customer environment and the analyzing comprises retrieving private data within the customer environment.

11. The one or more computer-readable media of claim 9, wherein the first instructions are executed in response to a request from a client to migrate the source front-end application to the target application in the target environment, and wherein execution of the third instructions further causes the proposed migration to be presented at the client for approval.

12. The one or more computer-readable media of claim 9, wherein execution of the first instructions additionally determines a version of the source front-end application, and wherein execution of the second instructions additionally selects the target application from a plurality of applications based at least partly on the version.

13. The one or more computer-readable media of claim 9, wherein execution of the second instructions causes a service request to be transmitted to a management host of the target application, in a case where no match is found for a given record of the one or more source records.

14. The one or more computer-readable media of claim 9, wherein the source front-end application and the target application implement at least portions of a graphical user interface in a database environment.

15. A system comprising:
- a database environment;
- one or more hardware processors with memory coupled thereto;
- a source application environment and one or more instances of a target application environment implemented on the one or more hardware processors; and
- computer-readable media storing instructions which, when executed by the one or more hardware processors, cause the one or more hardware processors to perform operations comprising:
  - analyzing a source front-end application and generating one or more source records, each of the source records comprising a first field representing a source extension implemented in the source front-end application, a second field representing a source hook through which the source extension is implemented, and a third field representing a corresponding source transaction type;
  - comparing the one or more source records with target records to determine one or more matches, each target record comprising a fourth field representing a target hook available in a target application, a fifth field representing a target transaction type, and a sixth field representing the target application;
    - wherein each match of the one or more matches indicates a given source record and a given target record, and is determined based on the second and fourth fields being matched and the third and fifth fields being matched; and
  - formulating, based on at least a given one of the one or more matches, a proposed migration of the source extension represented by the first field, using the target application represented by the sixth field and the target hook represented by the fourth field;
  - upon approval of the proposed migration, generating instructions to modify the target application and generating therewith, at a first instance of the target application environment, output replicating functionality of the source extension.

16. The system of claim 15, wherein the operations further comprise:
- from the source application environment:
  - retrieving extension fields of the source extension from a configuration database;
- at the first instance of the target application environment:
  - binding the extension fields to a target extension of the target application;
  - executing the target application with the target extension and the bound extension fields to generate the output replicating functionality of the source extension; and
  - presenting the output replicating functionality of the source extension to a user; and
- at a second instance of the target application environment:
  - responsive to the user's approval of the output, committing the bound extension fields to the target extension of the target application in the second instance of the target application environment.

17. The system of claim 16, wherein the retrieving, binding, and executing operations implement the proposed migration.

18. The system of claim 15, wherein the given match is a match between a first record of the source records and a second record of the target records, and the formulating comprises:
- combining fields of the first record and the second record.

19. The system of claim 15, wherein the source extension is a front-end source extension and the operations further comprise:

binding back-end logic of a back-end source extension to a target extension of the target application.

20. The system of claim 15, wherein the source application environment and the one or more instances of the target application environment provide respective user interfaces to the data base environment.

\* \* \* \* \*